(12) United States Patent
Glasgow

(10) Patent No.: US 7,930,731 B2
(45) Date of Patent: Apr. 19, 2011

(54) METHODS, SYSTEMS AND PROGRAM PRODUCTS FOR CREATION OF MULTIPLE VIEWS AND OPTIMIZED COMMUNICATIONS PATHWAYS BASED ON PERSONAL DESCRIPTORS

(75) Inventor: Jay Glasgow, Ackworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 547 days.

(21) Appl. No.: 12/122,103

(22) Filed: May 16, 2008

(65) Prior Publication Data

US 2009/0165090 A1 Jun. 25, 2009

Related U.S. Application Data

(60) Provisional application No. 61/015,849, filed on Dec. 21, 2007.

(51) Int. Cl.
*G06F 17/30* (2006.01)
*G06F 15/16* (2006.01)
*H04L 29/06* (2006.01)

(52) U.S. Cl. ............... 726/3; 726/4; 709/206; 709/207

(58) Field of Classification Search ............ 726/2–5, 726/26–28; 707/705, 736, 781, 785; 709/204–207
See application file for complete search history.

(56) References Cited

U.S. PATENT DOCUMENTS

| | | | | |
|---|---|---|---|---|
| 7,310,676 | B2 * | 12/2007 | Bourne | 709/227 |
| 7,853,661 | B2 * | 12/2010 | Bristol et al. | 709/207 |
| 2005/0120084 | A1 * | 6/2005 | Hu et al. | 709/206 |
| 2009/0112827 | A1 * | 4/2009 | Achlioptas | 707/3 |

* cited by examiner

*Primary Examiner* — Jung Kim
*Assistant Examiner* — Abdulhakim Nobahar
(74) *Attorney, Agent, or Firm* — Cantor Colburn LLP

(57) ABSTRACT

Multiple views and optimized communications pathways of personal descriptors are provided over a communications network for a globally accessible contact list of contacts in a database. User descriptors are automatically populated in a dynamic repository, and subsequently form personal descriptors. User queries and contact information are received anonymously and stored in a dynamic repository, based on adding the contact to an instant messaging roster state database, where the contact information is categorized, based on identifiable relationships between user descriptors and a group of user defined rules. Such user contact information is transmitted and/or received to and/or from contacts in the globally accessible contact list so as to share presence and access information, and where the user is an authorized user providing varying levels of access information. Sharing access to the personal descriptor includes the use of a communications broker, rendering an animated personal descriptor and completing social and business interactions.

17 Claims, 7 Drawing Sheets

PIXIE 300

| MIDDLE INITIAL | M. |
| --- | --- |
| LAST NAME | DOE |
| FIRST NAME | MAYA |
| PLACE OF WORK | AAA INVESTMENTS |
| WORK URL | http://WWW.AAAINVEST.COM |
| WORK PHONE | 404 555 1234 |
| HOME PHONE | 404 555 2525 |
| INTERESTS | MUSIC, CATS, TRAVEL |
| MEDICAL ALERT | ALLERGIC TO ORANGES |
| ... UP TO | ... UP TO |
| INFO CATEGORY n | INFORMATION TYPE n |

PERSONAL INFORMATION AND INTERESTS 302

AVATAR 304

IM ROSTER STATE DIAGRAM 90

IM ROSTER STATE DIAGRAM 90

IM ROSTER STATE DIAGRAM 90

IM ROSTER STATE DIAGRAM 90

IM ROSTER STATE DIAGRAM 90

IM ROSTER STATE DIAGRAM 90

METHODS, SYSTEMS AND PROGRAM PRODUCTS FOR CREATION OF MULTIPLE VIEWS AND OPTIMIZED COMMUNICATIONS PATHWAYS BASED ON PERSONAL DESCRIPTORS

CROSS-REFERENCE TO RELATED APPLICATION

This application contains subject matter which is related to the subject matter of the following co-pending provisional application which is assigned to the same assignee as this application, AT&T Delaware Intellectual Property, Inc. The below listed co-pending provisional application is hereby incorporated herein by reference in its entirety: U.S. Provisional Patent Application No. 61/015,849.

BACKGROUND

Exemplary embodiments generally relate to telecom related infrastructure routing and switching as applied to an electronic personal profile system and more particularly, to service application messaging applied to the creation of multiple views of personal descriptors and optimization of communications pathways, based on personal descriptors.

Individuals use many different types of devices and transports to manage their communications needs. In most of these different types of devices and transports, there is an ability to manage information about others whom individuals wish to contact or relate with, that is information, such as, address books, contact lists, and calendars. However, individuals' concepts of self information are in only a few of these different types of devices and transports. Therefore, individuals can be left to create and recreate information about others over and over again, as the individuals transition from device to device, thus causing duplication of data, as well as duplication of effort in transferring data, including contact numbers and important dates. Standardized information describing individuals usually cannot provide a comprehensive individual profile. Even though users may enter volumes of information about friends, family and others into varying devices and organizers, what is captured barely scratches the surface of the real depth of information, characteristics and personal traits of friends, family and other individuals.

Individuals have a plurality of interests, characteristics and descriptive content. An interest can be some aspect about an individual that the individual willingly and electively gravitates towards, comprising, for example, places an individual lives, pets the individual owns and entertainment, games and/or outdoor activities the individual is interested in. A characteristic is some aspect about an individual that is not so easily changed, such as the physical makeup and the birthday of the individual. Descriptive content includes files that individuals maintain, such as music files, movie clips and pictures of their family and friends.

Relationships individuals have affect how and what information the individuals share with other individuals and what aspects of themselves they choose to expose to others. For example, individuals share different aspects of themselves in different ways with a variety of different groups of other individuals and/or contacts. An individual may behave one way with family members and another way with friends. Further, individuals may act a certain way at work and may act another way in places of worship or out in the community. In addition, some individuals share their cell phone number with some contacts, while only giving a business number to others. In some circles, individuals feel comfortable sharing their birthday information with friends but may not want to share their birthday information with acquaintances at work. In some situations, individuals share selective portions of their personal information in different ways and with selective other individuals. In some circles, individuals share photographs of their true image, while in other circles, individuals share stylized caricatures that represent some aspect of their personality. Further, individuals may have some aspects, interests, characteristics, traits, as well as medical and/or emotional conditions they wish to keep extremely private and share only with others who need to know, such as in medical emergencies. Thus, information that individuals may want to be known only by certain friends and family members is excluded from information sharing with others.

Telecommunications capabilities include audio only, visual only (i.e., text messaging), and combined audio/visual (herein referred to as A/V) modes of communications. Seeing and/or hearing a first individual communicator enhances the experience for another individual and/or other individuals receiving communications from the first individual communicator. There is less chance for miscommunication when a message is heard, and/or seen, as with text messages and/or when the expressions and gestures of a communicator can be observed while communicating and/or speaking to an audience, such as with live communications in person, video chats, video conferencing, and even video mail or recorded video messages. Examples of audio only communications include phone calls, voice mails, records and CD's. When no ability is available for either audio or A/V communications, individuals resort to text, such as writing emails, letters, notes, text messages, instant messages, etc. Also, communications can be in the form of visual messages only, such as pictures, videos, charts, maps, and other graphical representations.

The proliferation of cell phones, land line phones, e-mail systems, text messaging systems, instant messaging systems, and facsimile communications modes have created a world where there are numerous ways of contacting individuals. Individuals have the ability to electronically transmit personal contact information via cell phones, personal digital assistants (PDAs), instant messaging and e-mail. Instant messaging systems allow individuals to create and store online a list of personal contacts for which the individuals "presence" and contact information can be shared. The term "presence" information relates to a feature where authorized users or "buddies" are provided with a visual indication that a person is available to communicate. Individuals can also create and store personal contact lists in their cell phones, PDAs, computers and e-mail accounts. However, there is currently no central repository for an individual to store all of his/her contact information along with his/her "presence" information all of which facilitate optimizing communications pathways, based on personal descriptors.

BRIEF SUMMARY

According to a first exemplary embodiment, a computer implemented method, computer system and computer readable medium provide multiple views of user personal descriptors over a computer network. These multiple views of user personal descriptors are received and/or provided over a communications network for a globally accessible contact list of contacts in a database. A first and a second set of user personal descriptors are automatically populated and stored in a dynamic repository, where the user personal descriptors are used to form smart avatars. A first individual user of a plurality of individual users is queried for access information by at least one contact user and/or a second user of a plurality of contact users listed in a globally accessible contact list. Contact information is received and/or transmitted anonymously to and/or from any one or more of the individual users and/or any one or more of the contact users and stored in a dynamic repository. The method comprises providing, in real time over a computer network, at least one tier of access information of a plurality of tiers of access information. Also, the method further comprises providing portions of the first set of user personal descriptors and providing portions of the second set of user personal descriptors to the at least one individual user and/or the at least one contact user from the plurality of individual users and the plurality of contact users listed in the globally accessible contact list, based on the group of user defined rules, where providing the at least one tier of access information with portions of the first set of user personal descriptors and portions of the second set of user personal descriptors forms multiple views in real time of a third set of user personal descriptors, which are shared over the computer network by the method and system with either at least the individual user and/or the contact user, in the form of a smart avatar.

According to a second exemplary embodiment, a computer implemented method, a computer system and a computer readable medium provide, over a computer network, multiple optimized communications pathways for sharing user personal descriptors (i.e., pixies). Optimized communications pathways personal descriptors are provided and/or received over the computer network, which includes a communications network for a globally accessible contact list of contacts in a database. A first and a second set of user personal descriptors are automatically populated and stored in a dynamic repository, where the user personal descriptors are used to form smart avatars. Contact information is received and/or transmitted anonymously to and/or from any one or more of the individual users and/or any one or more of the contact users and stored in a dynamic repository, where the contact information is categorized, based on identifiable relationships between user personal descriptors and a group of user defined rules that are defined by the plurality of individual users and/or the plurality of contact users. Such categorized user contact information is transmitted and/or received to and/or from at least one of the plurality of contacts, either the individual user and/or the contact user listed in the globally accessible contact list, so as to share presence information. The plurality of individual users and the plurality of contact users are authorized users providing varying levels of access information, based on the group of user defined rules. A request to access a pixie is received and the pixie owner (the pixie owner is also referred to herein as the individual user personal descriptor owner) is notified of the request. The pixie owner either rejects or permits the access to the pixie, based on adding the contact to an instant messaging roster state database, where contact states are entered and arranged in fields to indicate a grant of permission and/or a denial of permission to access the pixie. The system notifies the contact person that access to the pixie has been permitted by the pixie owner, and the system facilitates sharing information between the pixie owner and the contact user who requested access to the pixie. Sharing access to the pixie includes the use of a pixie talk communications broker, which includes a pixie ID, used for rendering an animated pixie and completing social and business interactions.

Other systems, methods, and/or computer program products according to embodiments will be or become apparent to one with skill in the art upon review of the following drawings and detailed description. It is intended that all such additional systems, methods, and/or computer program products included within this description, be within the scope of the present application, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

The disclosed exemplary embodiments are intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote limitations of quantity, but rather denote the presence of one or more of the referenced item(s).

Even though users may enter volumes of information about friends and family into varying devices and organizers, what is captured barely scratches the surface of the real depth of information, characteristics and personal traits of acquaintances, associates, friends and family. Thus, exemplary embodiments capture and share information that friends and family may want others to know about them, but which is usually excluded.

According to an exemplary embodiment, a user is allowed to populate a virtual calling card or business card with contact information. According to one embodiment, the "virtual calling card" may include certain information that is only provided to certain authorized persons. Furthermore, certain personal contacts may be excluded from certain information available in the "virtual calling card". Further, personal contact information having certain restrictions on use may be anonymously provided, where the personal contact information includes presence indications for communicating via a cell phone, text messaging, facsimile or e-mail before the communication is attempted. Also, an individual's personal contact information may be automatically created and stored in a central location that is accessible globally.

Thus, according to an exemplary embodiment, a system of providing a virtual calling card that provides global access, presence information, and rule restrictions based on the recipient is included. The method and system provides a global calling card that facilitates communication with a user, while allowing the user to restrict accesses to certain information based on the particular recipient of the card.

Figure 1:
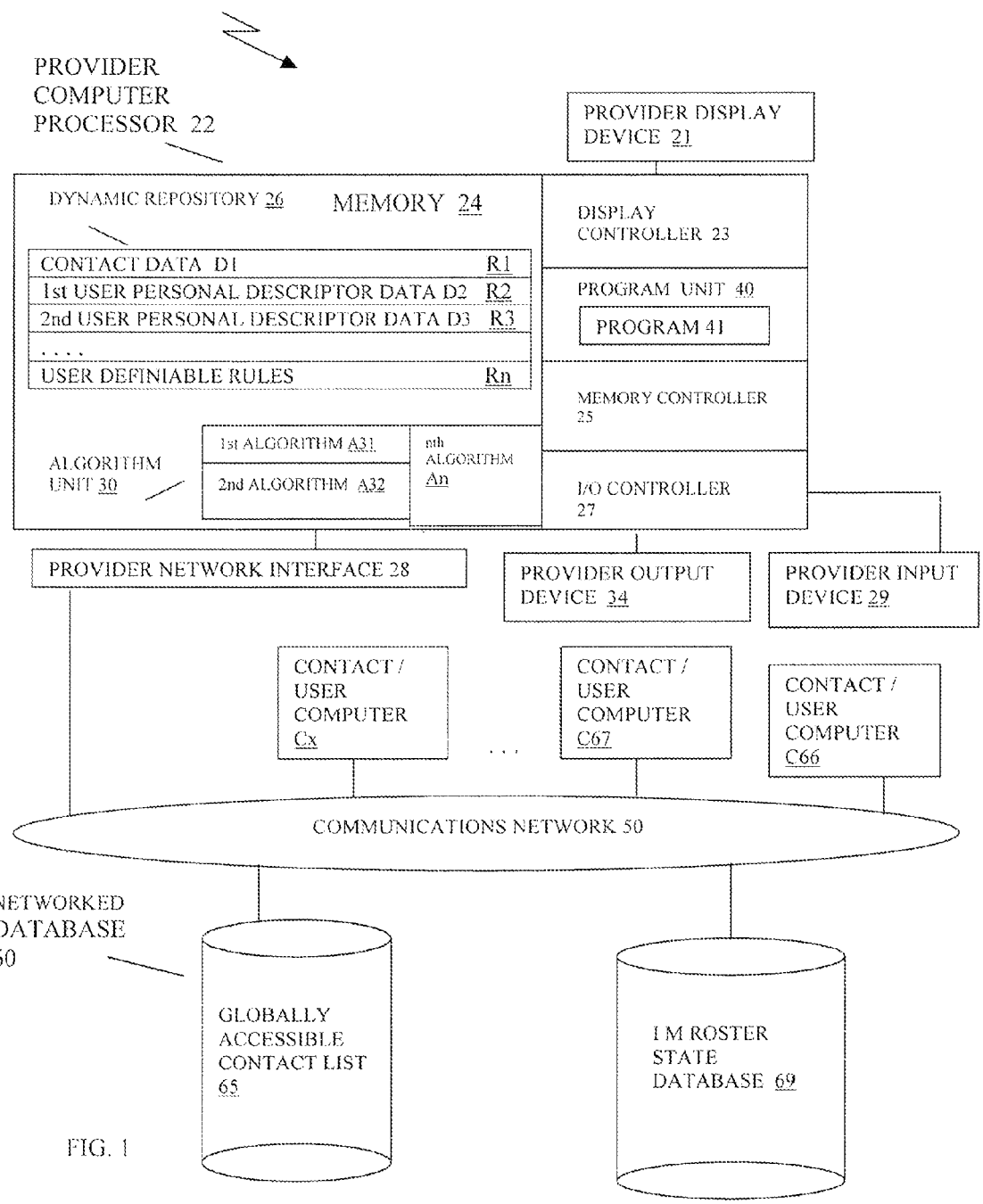
FIG. 1 illustrates a global network address book provider system, which implements the method of creating a personal descriptor, as illustrated in FIG. 2, and implements the method of creating personal descriptor communications pathways illustrated in FIG. 10, according to exemplary embodiments.
Figure 2:
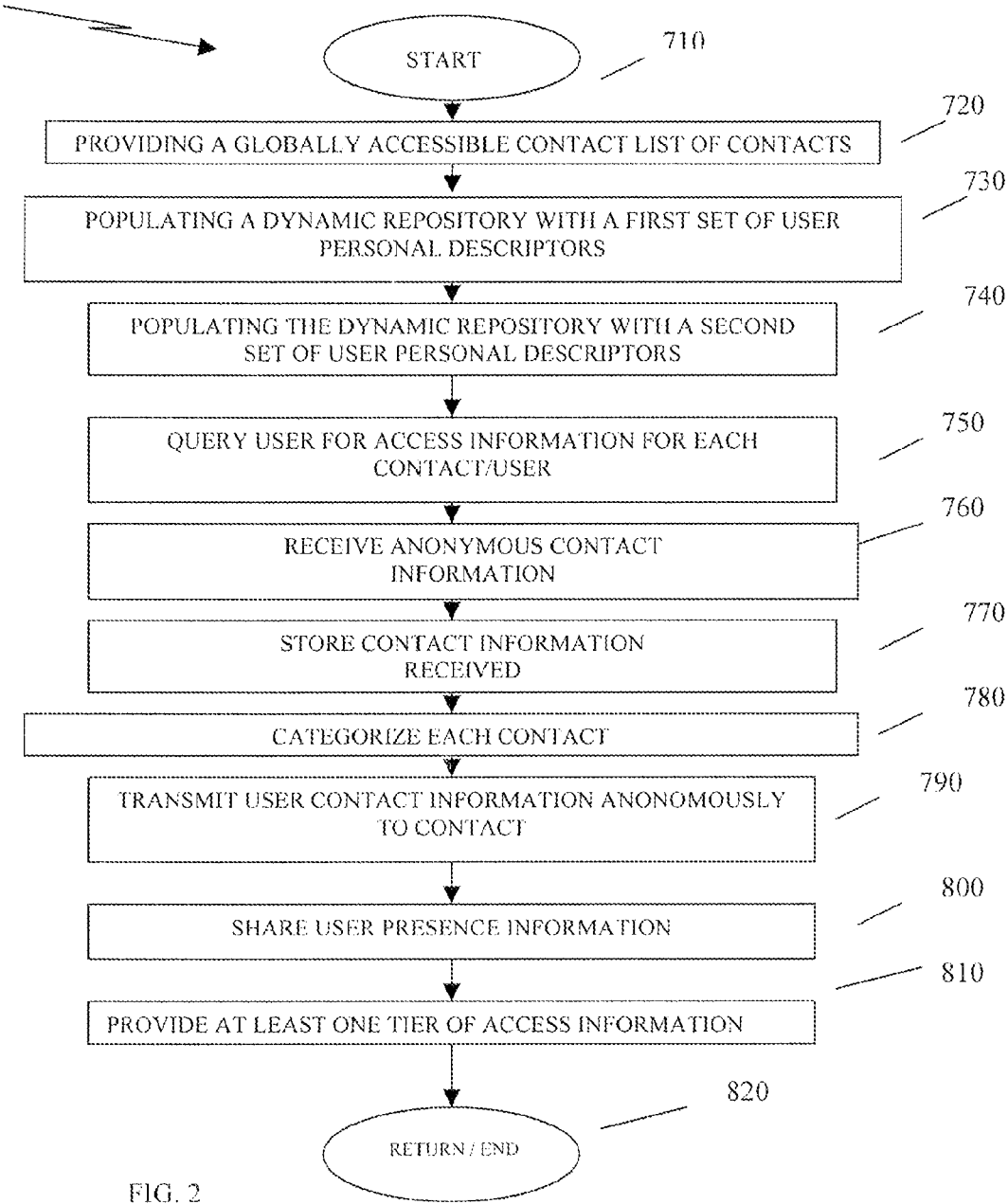
FIG. 2 illustrates a method of creating a personal descriptor, according to an exemplary embodiment.

In a first exemplary embodiment, a personal descriptor creation method 700 (herein referred to as the "method 700") and a global network address book provider system 20 (herein referred to as the "GNAB provider system 20") running on a general purpose computer executing computer executable program code that causes the general purpose computer to create multiple views of user personal descriptors are illustrated in FIGS. 1 and 2, respectively.

Referring first to FIG. 1, according to an exemplary embodiment, the GNAB provider system 20 includes a provider computer processor 22, which contains a memory 24. An algorithm unit 30 resides in the memory 24 and contains a plurality of algorithms including a first algorithm A31 and a second algorithm A32 up to an nth algorithm An. Also residing in the GNAB provider system 20 is a program unit 40 containing a program 41. The memory 24 also contains a dynamic repository 26, which contains a plurality of repository entry locations, such as a repository entry location R1, a repository entry location R2, a repository entry location R3 and up to a repository entry location Rn, which hold and/or store a plurality of data including a contact data D1 in the repository entry location R1, a first user descriptor data D2 in the repository entry location R2, a second user descriptor data D3 in the repository entry location R3 and a set of user definable rules in the repository entry location Rn.

In exemplary embodiments, the GNAB provider system 20 includes a combination of controllers including a display controller 23, a memory controller 25 and an input/output (I/O) controller 27 and a combination of computer peripheral devices communicatively coupled to the system 20, including a provider display device 21, a provider input device 29, a provider output device 34, and a provider network interface 28, via standard interface connectivity. The input device 29 can be at least one of a mouse, a keyboard, a touch screen, a joystick, a thumbwheel, a light pen wand, a microphone or an electronic and/or a radio frequency scanning device. The provider network interface 28 cooperatively couples the provider computer processor 22 to operate in conjunction with a communications network 50 to a plurality of contact user computers, such as a contact user computer C66, a contact user computer C67 up to a contact user computer Cx. The plurality of contact user computers including the contact user computer C66, the contact user computer C67 up to the contact user computer Cx includes a plurality of storage devices. The communications network 50 can be a wide area network, including an Internet or an extranet or the communications network 50 can be a local area network, including an intranet.

Figure 10:
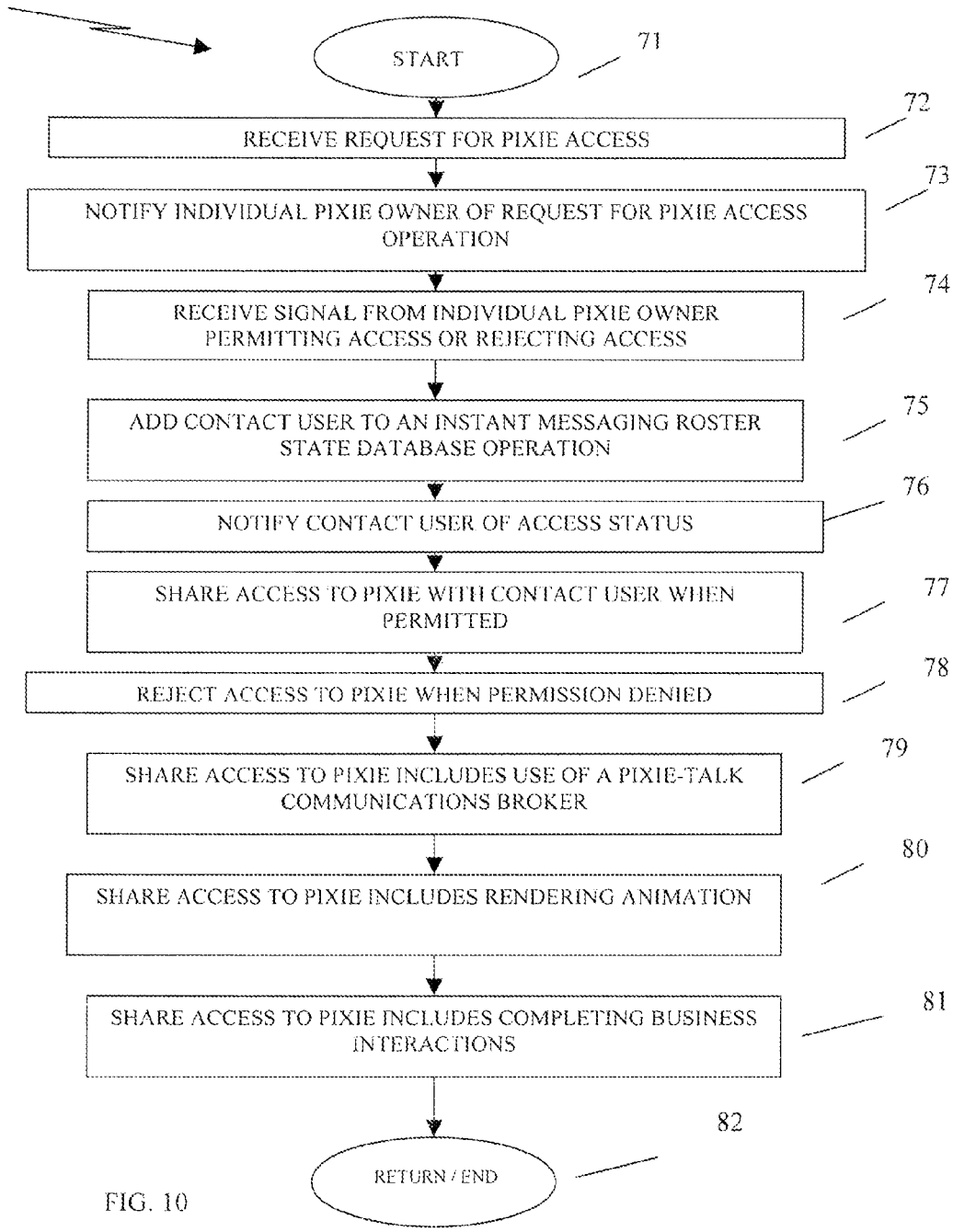
FIG. 10 illustrates a method of creating a personal user pixie profile, according to an exemplary embodiment.

In exemplary embodiments, the GNAB provider system 20, a method 70 illustrated in FIG. 10 and the method 700 can be implemented in software (e.g., firmware), hardware or a combination of both. According to exemplary embodiments, the method 700 (FIG. 2) and/or the method 70 (FIG. 10) are implemented in software, as executable program code, such as the program 41, which comprises an ordered listing of executable instructions for implementing logical functions, and which is executed by a special or general purpose digital computer including a personal computer, a workstation, a minicomputer or a mainframe computer. Also, the software in the memory 24 includes a suitable operating system. In exemplary embodiments, the GNAB provider system 20 is implemented in a general purpose digital computer designated as a provider computer processor, such as the provider computer processor 22. The provider computer processor 22 is a hardware device for executing software including software stored in the memory 24 and in the program unit 40, including the program 41. The provider computer processor 22 can be any custom made or commercially available, off-the-shelf processor, a central processing unit (CPU), one or more auxiliary processors, a semiconductor based microprocessor, in the form of a microchip or chip set, a macroprocesssor or generally any device for executing software instructions. The memory 24 and a globally accessible contact list 65 can include any one of or combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CD-ROM or FLASH memory) magnetic tape, disk, diskette, cartridge, cassette and/or optical memory. The memory 24 can have an architecture where various components are situated remotely from one another, but can be accessed by the provider computer processor 22. A "globally accessible contact list", such as the globally accessible contact list 65, is implemented in the GNAB provider system 20

The GNAB provider system 20 when implemented in hardware can include discrete logic circuits having logic gates for implementing logic functions upon data signals, or the GNAB provider system 20 can include an application specific integrated circuit (ASIC).

In the first exemplary embodiment, referring to FIG. 1 and FIG. 2, at an operation start 710 (hereafter referred to as the "operation 710"), the GNAB provider system 20 receives a signal from an operator and/or individual user and/or contact user input device including the input device 29, which activates and initiates the program 41 where the method 700 is stored as executable program code on a computer executable medium. Once activated, the program 41 performs other operations of the method 700 from selection signals received from the input device 29, causing the program 41 to be executed by the provider computer processor 22 to perform operations of the method 700, thereby calling the first algorithm A31 and the second algorithm A32 up to the nth algorithm An, to perform operations and sub operations of the method 700 of creating user personal descriptors and multiple personal descriptor views (i.e., multiple pixie views). As used herein, the term pixie means a smart avatar derived from user personal descriptors. Thus, the terms pixie, user personal descriptor and smart avatar are used interchangeably throughout the application.

Figure 11:
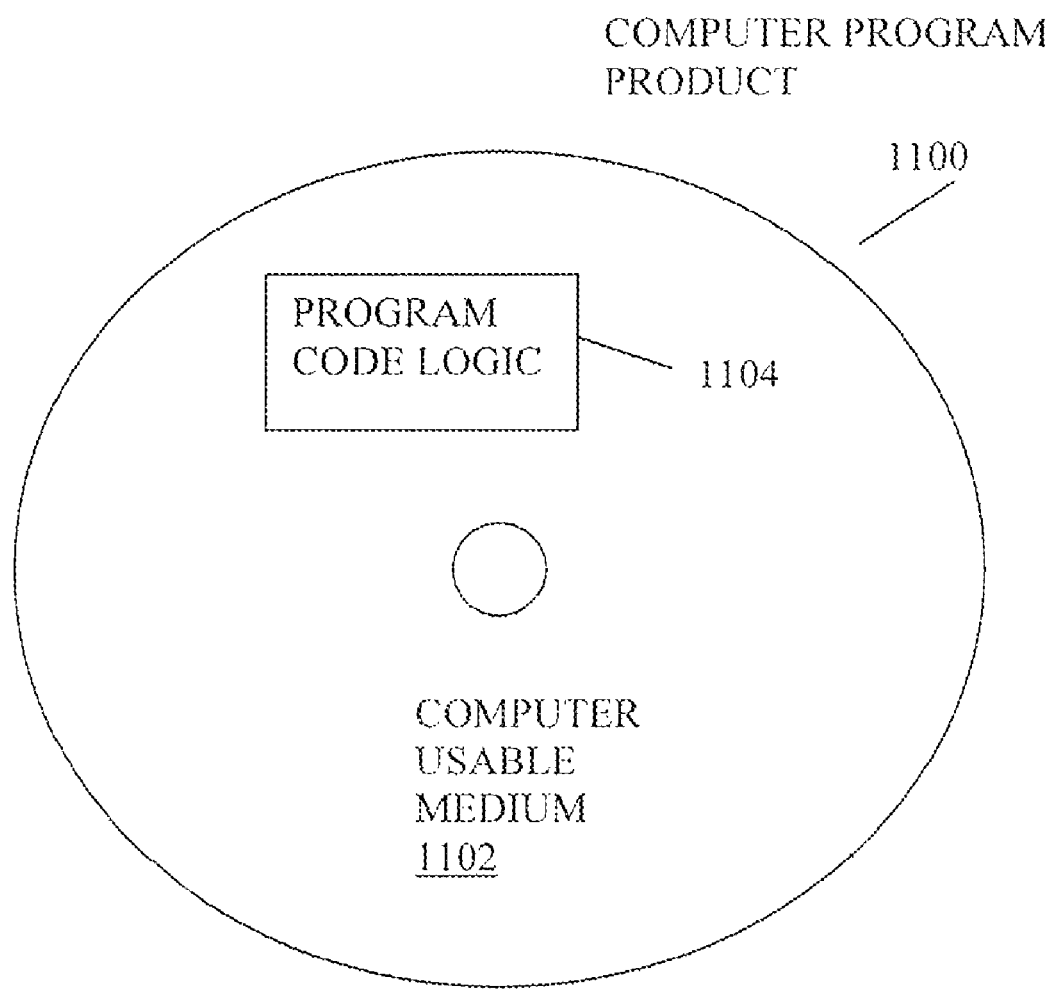
FIG. 11 illustrates one embodiment of a computer program product incorporating one or more aspects of the present invention.

As described above, exemplary embodiments can be represented in the form of computer implemented processes, apparatuses and computer readable media for practicing those processes. In exemplary embodiments, the invention is implemented in computer program code executed by one or more network elements. Exemplary embodiments include a computer program product 1100 as depicted in FIG. 11 on a computer usable medium 1102 with computer program code logic 1104 containing instructions embodied in tangible media as an article of manufacture. Exemplary articles of manufacture for computer usable medium 1102 may include floppy diskettes, CD-ROMs, hard drives, universal serial bus (USB) flash drives, or any other computer readable storage medium, wherein, when the computer program code logic 1104 is loaded into and executed by a computer, the computer becomes an apparatus for practicing the invention. Embodiments include the computer program code logic 1104, for example, whether stored in a storage medium, loaded into and/or executed by a computer, or transmitted over some transmission medium, such as over electrical wiring or cabling, through fiber optics, or via electromagnetic radiation; thus, when the computer program code logic 1104 is loaded into and executed by a computer, the computer becomes an apparatus for practicing the invention. When implemented on a general purpose microprocessor, the computer program code logic 1104 segments configure the microprocessor to create specific logic circuits.

Referring again to FIG. 1 and FIG. 2, at an operation receiving a globally accessible contact list of contacts 720 (hereafter referred to as the "operation 720"), the program 41, executed by the provider computer processor 22, causes the method 700 to instruct the provider computer processor 22 to provide and/or receive a globally accessible contact list, such as the globally accessible contact list 65, of a plurality of contacts in a networked database 60.

At an operation for populating a dynamic repository with a first (1st) set of user personal descriptors 730 (hereafter referred to as the "operation 730"), the program 41, executed by the provider computer processor 22, causes the method 700 to instruct the provider computer processor 22 to automatically populate the dynamic repository 26 with a first set of user personal descriptors of either the individual user and/or other individual users and/or contacts from a plurality of contacts either already listed in the globally accessible contact list 65 of contacts or who are not already listed in the globally accessible contact list 65 of contacts.

At an operation for populating the dynamic repository with a second (2nd) set of the user personal descriptors 740 (hereafter referred to as the "operation 740"), the program 41, executed by the provider computer processor 22, causes the method 70 to instruct the provider computer processor 22 to automatically populate the dynamic repository 26 with a second set of user personal descriptors of either the individual user and/or other individual users and/or contacts from a plurality of contacts either already listed in the globally accessible contact list 65 of contacts or who are not already listed in the globally accessible contact list 65 of contacts.

According to exemplary embodiments, user personal descriptor information content (i.e., pixie content, as in pixie 300) is automatically updated, and automatically populated into one or more contact lists such as the globally accessible contact list 65 of the computer implemented GNAB provider system 20. Further, according to exemplary embodiments, pixie information content (such as pixie 300 information content) includes, but is not limited to interests of an individual, and individual characteristics. An interest can be some aspect about an individual that the individual willingly and electively gravitates towards, including, for example, places the individual lives, pets the individual owns and entertainment, games and/or outdoor activities the individual is interested in. A characteristic is some aspect about an individual that is not so easily changed, such as physical makeup and birthdays. According to exemplary embodiments, pixie information content (such as pixie 300 information content) further includes files an individual maintains, such as music files, movie clips and pictures of the individual's family and friends. In addition, pixie information content (such as pixie 300 information content) may include user personal descriptor data, including audio, video, text and still graphic representations. The video representations include animated avatars and the still graphic representations also include avatars. Furthermore, pixie information content (such as pixie 300 information content) represents data including, but not limited to personality traits; contact information; preferences, including likes and dislikes; gift registries; favorite colors; favorite flowers; favorite sports activities and favorite teams; coupon registry; business card information disbursement; wish lists; and presence information including, but not limited to, for example, time of day or night a user and/or a contact are available and logged on and can see and/or retrieve information and add information to a global network address book, such as the GNAB provider system 20.

According to exemplary embodiments, as individuals move from one geographical location to another or as individuals change services, change jobs, experience family changes or grow older, the user personal descriptor data (i.e., pixie data) of the individuals will be automatically updated by the computer implemented global network address book provider system, such as the GNAB provider system 20, and automatically populated into computer implemented contact lists to simplify the updating process of the individuals' latest personal descriptor/pixie information, so the individual user does not have to update his/her information manually; although, the individual user can manually update and edit his/her personal descriptor/pixie information, if desired or required. An always updated personal descriptor/pixie is the personal descriptor/pixie that may be most used by individual users and contacts, where the personal descriptor/pixie may be represented as the pixie 300. As an individual's core personal descriptor/pixie information is updated, the individual will be provided with a choice to share this updated information with anyone for whom the individual has shared his/her pixie information with in the past. This choice can be by total listing of the personal descriptor/pixie information or by characteristic or interest or custom group classification or unbundled piecemeal/piece-wise listings including updating family and/or next-door neighbors but not friends. Thus, the individual owner of the pixie (such as the pixie 300) remains in control of his or her own data even though a view of that information appears in someone else's address book. The caller, information seeker and/or contact user can select a desired chronological communications modality including communicating live and in real-time, such as making a phone call or in a cached way, such as with voice mail; also, the information seeker can select a mode including audio/visual, audio only, text only, and/or visual only.

In exemplary embodiments, a global network address book provider, including a local telephone company provider, obtains permission from individual subscribers/users to mine all of the data known to the telephone company about the individual subscribers/users and/or contacts. In accordance with exemplary embodiments, the concept of a pixie identifier (i.e., a pixie ID) is herein described, where upon authenticating and obtaining rights and privileges from the individual subscribers/users and/or contacts, the provider establishes the individuals with their individual pixie identifiers (i.e., pixie ID's) and data mines the provider's (i.e., telephone company's) archives in order to automatically pre-populate the GNAB provider system 20 with the individual subscriber's information, in order to provide an enjoyable experience for the individual owner/subscriber. The information to pre-populate the GNAB provider system 20 may be obtained from information already known by the provider company including the individual's address, phone number, country of origin, and federal information processing standards (FIPS) codes. Since the computer implemented GNAB provider system 20 will help introduce people to each other, based upon the information already entered, there is a high probability of immediately finding others with similar interests. The safe anonymity of the pixie ID protocol enables people to feel confident to engage others via either direct or indirect communications. During the pixie ID creation process for a given individual, the individual may select from standard interests and characteristics lists, and/or add new interests and characteristics to the content of the individual's pixie ID. According to exemplary embodiments, these new interests and characteristics lists are analyzed by a team of employees of the provider, who evaluates the individuals as candidates for future personal descriptor/pixie tree social networking nodes, as well as, revenue opportunities with sponsors. The individual users may select his/her own interests and characteristics and his/her own pixie (such as pixie 300) will gain new attributes that have baseline values. These values will grow over time as the associated individuals grow, develop, age and/or mature. The individual users/contact users can expose these values to others as a matter of pride or as a means of communal association.

In exemplary embodiments, the GNAB provider system 20 includes the information found in the globally accessible contact list 65. Therefore, the contact data D1, the first set of user personal descriptor data D2 and the second set of user personal descriptor data D3 are either data already listed in the globally accessible contact list 65 of contacts or are not already listed in the globally accessible contact list 65 of contacts. In exemplary embodiments, the contact data D1, the first set of user personal descriptor data D2 and the second set of user personal descriptor data D3 can be received by the GNAB provider system 20 and the method 700 from signals entered manually, executed by an individual user through the provider input device 29 of the GNAB provider system 20 to populate the dynamic repository 26.

Figure 3:
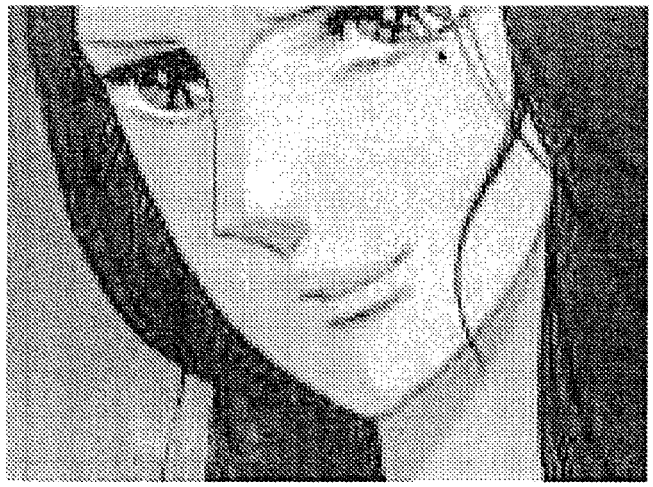
FIG. 3 illustrates a pixie and the elements that the pixie is composed of, thus forming the foundation for a personal descriptor, according to an exemplary embodiment.
Figure 3:
Figure 3:
Figure 4:
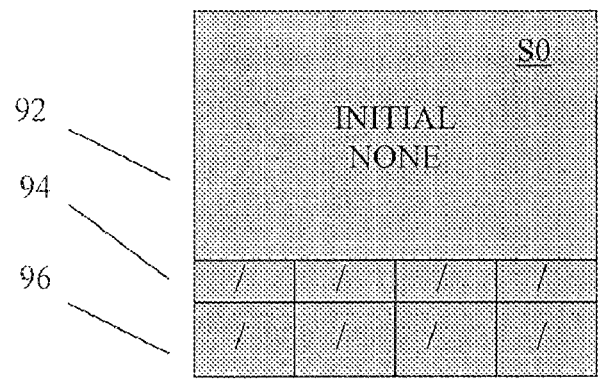
FIGS. 4-9 illustrate states S0-S5, respectively, of Instant Messaging Roster State Diagram 90, representing the instant messaging roster states attached to user pixie address book information, according to an exemplary embodiment.
Figure 5:
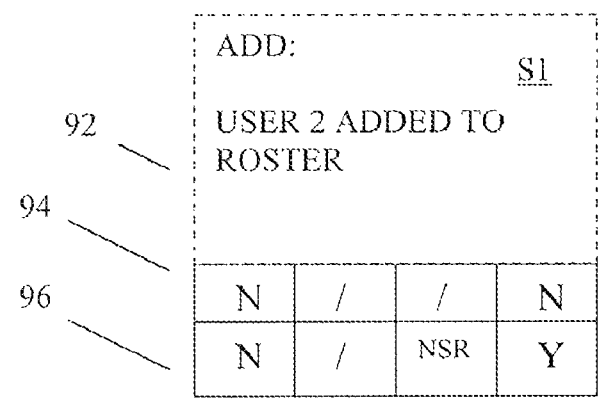
Figure 6:
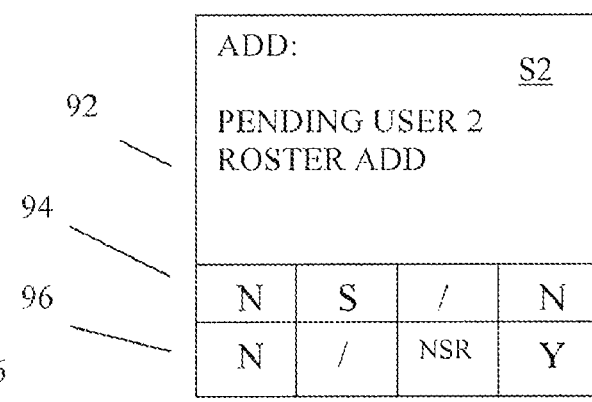
Figure 7:
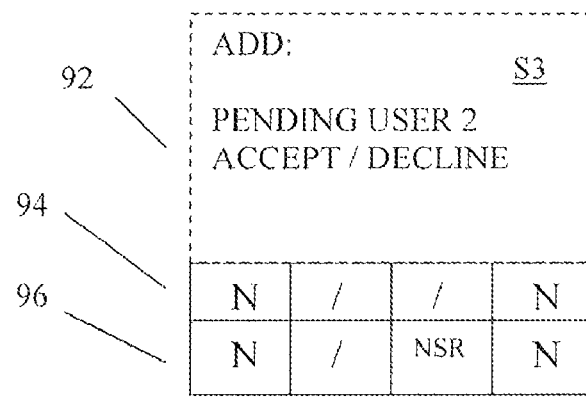
Figure 8:
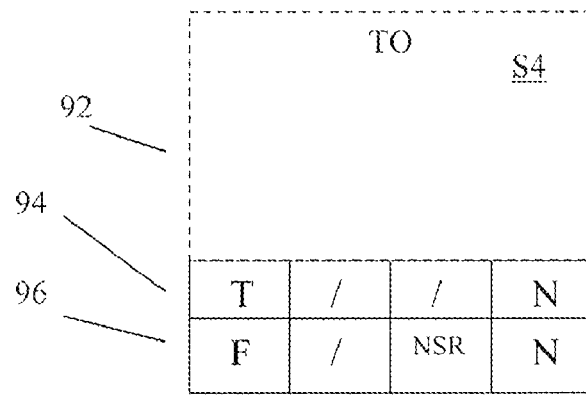
Figure 9:
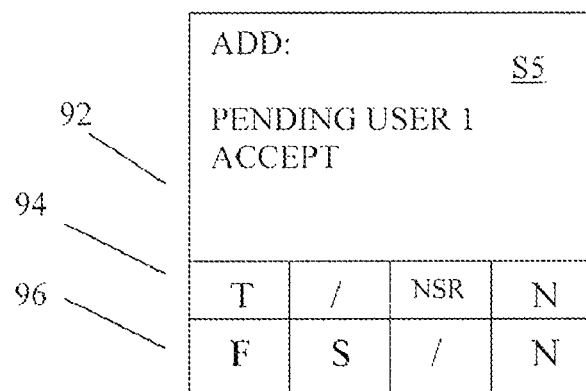

Referring to FIGS. 1 and 2, the first and second sets of user personal descriptor data D2 and D3, respectively, include audio, video, text and still graphic representations. The video representations may include animated avatars and the still graphic representations may also include avatars, which may be still or inanimate. An avatar 304 is illustrated in FIG. 3. The text and audio representations include descriptions of avatars, such as the avatar 304. Text representations and descriptions of a personal information and interests 302 table, as illustrated in FIG. 3, may include: middle initial "M."; last name "DOE"; place of work "AAA INVESTMENTS"; work (uniform resource locator) url "http://WWW.AAAINVEST-.COM"; work phone "404 555 1234"; home phone "404 555 2525"; interests "MUSIC, CATS, TRAVEL"; and an entry for a medical alert "ALLERGIC TO ORANGES". In exemplary embodiments, the amount of descriptor data, i.e., audio, video, text and still graphic representations can be infinite, limited only by the hardware capacity and/or virtual capacity and bandwidth of the GNAB provider system 20 and as illustrated in FIG. 3, any information category (i.e., an "INFO CATEGORY n") can be expanded to an infinite/unlimited information type (i.e., the "INFORMATION TYPE n"). According to exemplary embodiments, the second set of user personal descriptors D3 includes previously granted information, wherein the first set of user personal descriptors D2 and the second set of user personal descriptors D3 combined with the avatar 304 compose a pixie 300, and the pixie 300 includes a pixie code used to prevent identify theft. Thus, the term pixie (such as the pixie 300) may be defined to mean the combination of user personal descriptors with an avatar (such as the avatar 304), including a pixie code, where the user personal descriptors may be composed of information in the personal information and interests 302 table. Furthermore, the pixie 300 represents data including, but not limited to, personality traits; contact information; preferences, including likes and dislikes; gift registries; favorite colors; favorite flowers; favorite sports activities and favorite teams; coupon registry; business card information disbursement; wish lists; and presence information including time of day or night a user and a contact are available and logged on and can see and/or retrieve information and add information to a global network address book, such as implemented by the GNAB provider system 20. In accordance with exemplary embodiments, the audio information is a common denominator for communicating between the individual user and the contact, where the contact has limited and/or initial trump/restriction/limitation capability and the individual user (of whom information and/or contact is sought) has final trump/restriction/limitation capability, in regard to facilitating two-way communication and sharing of information and filtering unwanted input from unwanted contacts to maintain privacy considerations all used to define the personality of the user and/or the contact in the pixie 300.

Again referring to FIG. 3, the pixie 300, composed of the combination of the personal information and interests 302 table and the avatar 304 describes a smart avatar as representing the variety of interests, characteristics, images and content information that make up the profile of an individual, where the avatar 304 includes representations of various dimensional images of the individual or a text construct of the individual. The term avatar, such as the avatar 304 also refers to the personality connected with the image of the individual. Further, the smart avatar is an electronic version of an individual, as defined by image and personality traits including interests, characteristics and content. Thus, exemplary embodiments herein describe an electronic computer implemented tool called the pixie 300. Therefore, like an avatar, such as the avatar 304, the pixie 300 is an electronic iconic representation of an individual. However, beyond a mere icon, the pixie 300 includes contact information, presence information, attributes, ratings, characteristics, traits interests, and links to content, all of which can be included as part of the personal information and interests 302 table. The pixie 300 contains much more detailed information and allows the individual represented by the pixie 300 to control how the information representing the pixie 300 is distributed, transferred and/or shared. It is common practice to use pictures to represent individuals on Internet web sites. These pictures can include cartoons that reveal some aspect of the personality of an individual or a real photo of the individual can be used. In exemplary embodiments, the pixie 300 takes the concept of pictures representing individuals on the Internet to a new level providing secure tailored information based on who is actually consuming the information and the relationship the consumer has with the individual owner of the pixie 300.

In exemplary embodiments, the pixie 300 represents and conveys multiple personalities of the pixie owner, including the representative individual pixie owner, such as Maya M. Doe included in the personal information and interests 302 table illustrated in FIG. 3. Contact users who are total strangers may be allowed to see only a picture that the individual pixie owner chooses to represent to strangers. However, contact users who are friends of the individual pixie owner, such as the pixie owner of the pixie 300 are permitted to see the picture, along with seeing a phone number, as well as, the individual pixie owner's presence information or other information, all as part of the individual pixie owner's pixie 300. Thus, the description of the pixie 300 can include that of an automated, animated, graphical, customized business card, where the presentation of the customized business card can change depending on the audience that the individual owner of the pixie 300 wants to address. Further, the pixie 300 presentation can be programmed by programming computer executable code of the program 41 to change the displayable presentation of the pixie 300, as one person views it, based on that one person moving from one group to another group.

Referring to FIG. 1 and FIG. 2, at an operation query user for access information for each contact/user 750 (hereafter referred to as the "operation 750"), the program 41, executed by the provider computer processor 22, causes the method 700 to instruct the provider computer processor 22 to query the user for access information for each contact and/or user of the plurality of contacts in the globally accessible contact list 65. In exemplary embodiments, the combination of pixie information, the computer implemented global network address book containing personal information and interests 302 (as implemented in the GNAB provider system 20) and instant messaging roster state charting provide superior information control for individuals, where instant messaging roster state charting involves real-time sharing of pixie information and answering cached requests to share pixie information (such as personal information and interests 302), by coordinating the status of individual users and/or contacts. In a pull model of querying for information, an acquaintance, either a prior acquaintance or a newly met acquaintance requests the pixie (such as the pixie 300) of an individual personal descriptor/pixie owner listed in the globally accessible contact list 65 of a globally networked address book, as implemented in the GNAB provider system 20. The individual pixie owner is notified of the request, based on the individual pixie owner's own pixie ID. In exemplary embodiments, the individual personal descriptor/pixie owner can permit sharing of the individual pixie owner's information, but only the type of information that the individual pixie owner shares with friends (i.e., use of persona), and only if the acquaintance agrees and permits sharing his/her in-kind or other information with the individual pixie owner, as well (i.e., use of condition). A message may be returned to the individual pixie owner that the acquaintance has agreed to share the acquaintance's own information if the individual pixie owner agrees to share information. If the individual pixie owner agrees to share information by selecting, for example, a share my friend information category, then the new contact information may be made accessible to the individual pixie owner, and the permitted "share my friend information" of the pixie owner is accessible to the acquaintances, through the GNAB provider system 20. Thus, in the pull model of receiving information, the individual pixie owner/user, after being notified of a request for information, elects to receive contact information by permitting the request for information from the acquaintance/contact/user. Through the use of pixies, the individual pixie owner can also elect to permit information access with conditions.

According to exemplary embodiments, in a push model of querying for information, the individual pixie owner/user inputs the pixie ID for an acquaintance and/or newly met acquaintance/contact/person for whom the individual pixie owner/user wishes to share his/her own pixie information, and the next time the acquaintance logs on (which could be indicated via the use of alerts), the acquaintance/contact/person/and/or user would be notified that the individual pixie owner/user is attempting to share the individual pixie owner's information with the address book of the acquaintance. If the acquaintance accepts the individual pixie owner's/user's invitation, the contact information of the individual pixie owner appears in the address book of the acquaintance, in accordance with exemplary embodiments. Acquaintances can choose to block unsolicited pushes if they so desire. Thus, an acquaintance may always remain in complete control of his/her own informational sharing experiences through the GNAB provider system 20, in the same manner that the individual pixie owner/users may always remain in control of his/her own informational sharing experiences through the GNAB provider system 20.

Referring to FIG. 1 and FIG. 2, at an operation receive anonymous contact information 760 (hereafter the "operation 760"), the program 41, executed by the provider computer processor 22, causes the method 700 to instruct the provider computer processor 22 to receive contact information anonymously from each user and/or contact in the globally accessible contact list 65.

In exemplary embodiments, querying and receiving information by an individual's pixie ID provides the anonymous communications capability. Thus, the pixie ID enhances the concept of communications modality in that the pixie ID provides a handle that can be used in place of personal information like a name or telephone number. The pixie ID provides the ability for greater anonymity of the receiver of information, as well as the sender of information in communications with the computer implemented GNAB provider system 20. According to exemplary embodiments, a given pixie, such as the pixie 300, can have many personal identifiers, and these personal identifiers can include, for example: the name of an individual, the e-mail address of the individual and/or the phone number or numbers of the individual. All of these personal identifiers can be published or non-published and designated and permitted, based on the discretion of the individual owner of these personal identifiers. But, there is one identifier, the pixie ID, which can represent an individual's pixie, such as the pixie 300, without presenting any other personal information. In exemplary embodiments, when an individual is in a meeting or a social gathering, and the individual is interested in talking with or meeting or communicating in some manner with someone, such as a newly met acquaintance, from the meeting or social gathering, then the individual who owns a pixie identifier can give the newly met acquaintance that pixie identifier owned by the individual, in order to limit risk of giving out personal identifiers.

In exemplary embodiments, numeric characters and/or globe-down construction with geographic region representations may be used for pixie IDs to reduce the number of characters an individual and/or person has to remember or enter for a friend and/or an acquaintance. For example, a pixie ID of US-GA-B12ZA1 supports a world population of up to 141 trillion, where an individual customer could say his/her pixie code is Georgia B12ZA1. This format may also support 676 countries. Each country could support 208 billion total users in up to 676 states or regions, and each state supports up to 308 million users. The pixie system may enable first users to select their personal code, in a first come, first served mode. Individuals may also be permitted to pay a premium for a vanity pixie ID, such as for example, Georgia Peach1. Using the example above, a pixie identifier given to the newly met acquaintance could be US-Georgia B12ZA1 (also referred to as US-GA-B12ZA1). When a newly met acquaintance accesses his/her computer system, the acquaintance can access his/her accessible contact list as implemented in the accessible contact list 65 and/or the acquaintance can access the another user's accessible contact list, also implemented in the accessible contact list 65 of the computer implemented Global Network Address Book, such as the GNAB provider system 20. In the exemplary embodiments, the acquaintance/user may send and/or enter a pixie identifier of an individual owner/user of the GNAB provider system 20, such as the pixie ID: US-GA-B12ZA1 into his/her contacts list, such as represented by the globally accessible contact list 65. Then, the computer system of the newly met acquaintance may retrieve any information allowed through the use of instant messaging states (IM States) for the owner of the pixie identifier US-GA-B12ZA1. In exemplary embodiments, the pixie identifier is the extent of the information that the newly met acquaintance will see, in regard to the owner of the pixie identifier. In exemplary embodiments, various cryptographic implementations can be used to securely query, receive and/or share information.

Even though an acquaintance may be restricted in seeing and/or accessing only the pixie identifier, communications capabilities between individual pixie owners and contacts are still possible. The computer implemented global network address book, such as the GNAB provider system 20, may use the pixie ID to broker whatever levels of communications the individual owner of the pixie ID permits for a given level of contact. In exemplary embodiments, the pixie ID, which serves as the communications broker includes a pixie-talk communications broker capability. When typing is started, then the aspect of how the message is going to be transported is determined and/or calculated and/or computed subsequently by the program 41 executed by the provider computer processor 22, during the transmission of the message, where choices are provided as part of the interaction. According to exemplary embodiments, there is no need for separate clients for instant messaging, e-mail, texting, and/or other forms of electronically transmitted communications. However, there may be unnecessary communications interference on all communications transport devices. This is cumbersome and may lead to a negative overall individual pixie ID owner/user experience. The pixie-talk communications broker extends an interface that allows an individual pixie ID owner or contact person/user to select a person or group of people with whom to communicate and then, based on network presence and application availability, allows the individual pixie ID owner/author to either send a live text chat message or an email depending on technological conditions. If the individual pixie ID owner author wants to force one chronology over another, he/she may be allowed to do so. And, if the contact person receiving communications wants to overrule all and direct communications in a certain way, then the contact person receiving the communications can do that as well. Thus, individuals and/or contacts may focus on their messages and content rather than trying to pick the right device or application to facilitate the communications.

The pixie-talk communications broker, as implemented via the pixie ID, may be used for text communications and may also be extended to broker voice communications. For example, an individual pixie ID owner selects a contact's pixie, such as the pixie 300, and begins speaking into a microphone connected as an input device, such as the provider input device 29, to either the provider computer processor 22 or any one of the contact/user computers such as the contact/user computers C66 through Cx. In response, the computer implemented GNAB provider system, such as the GNAB provider system 20, may spool voice packets associated with the individual pixie ID owner's speech until either the contact person corresponding to the selected contact pixie or the voicemail of the contact person is engaged. At that point, the computer implemented GNAB system, such as the GNAB provider system 20, may play one or more short tones, alerting the individual pixie ID owner who is speaking that he/she is either connected live or being recorded. According to exemplary embodiments, the receiving contact person may hear the conversation on the spool from the beginning, while the individual pixie ID owner may hear a short lag before the reply of the contact person, at which time the conversation may continue live.

In exemplary embodiments, an information seeker who has an account on the contact list of the computer implemented GNAB system, such as the GNAB provider system 20, can contact an individual pixie owner without knowing any contact information associated with the individual pixie owner. The computer implemented GNAB system, such as the GNAB provider system 20, may use what is known about the transports available to both parties through the use of network presence and address book entries of an individual and/or a contact on the globally accessible contact list 65 of the computer implemented GNAB system, such as the GNAB provider system 20, and then the GNAB provider system 20, may automatically make the call happen from a central point of view. In exemplary embodiments, the individual owner of the pixie ID can grant permission for an acquaintance to send the individual owner of the pixie ID a blind email or leave a blind voice mail without knowing the real, underlying contact information of the individual owner of the pixie ID. Thus, in either private or controlled cases, an acquaintance can communicate with the individual owner of the pixie ID by only knowing the pixie ID of the individual owner.

Referring to FIG. 1 and FIG. 2, at an operation store contact information received 770 (hereafter the "operation 770"), the program 41, executed by the provider computer processor 22, causes the method 700 to instruct the provider computer processor 22 to store in the dynamic repository 26, contact information received from each contact of the plurality of contacts in the globally accessible contact list 65. In exemplary embodiments, the global network address book system 20, such as a local telephone company provider system, obtains permission from individual subscribers/users to mine all of the data known to the telephone company about the individual subscribers/users and/or contacts and enters, populates and stores that data in either the dynamic repository 26 and/or the globally accessible contact list 65 via the program 41. The method 700 can also store data in either the repository 26 and/or the globally accessible contact list 65, based on receiving signals entered manually as executed by a user through the provider input device 29 of the GNAB provider system 20 to populate the dynamic repository 26.

Referring to FIG. 1 and FIG. 2, at operation categorize each contact 780 (hereafter the "operation 780"), contact information is categorized, based on identifiable relationships between user personal descriptors and a group of user defined rules defined by the plurality of individual users and/or the plurality of contact users. Such categorized user contact information is transmitted and/or received to and/or from at least one of the plurality of contacts, either the individual user and/or the contact user listed in the globally accessible contact list 65, so as to share presence information. The plurality of individual users and the plurality of contact users are authorized users providing varying levels of access information, based on the group of user defined rules. Thus, the program 41, executed by the provider computer processor 22, causes the method 700 to instruct the provider computer processor 22 to categorize each contact of the plurality of contacts in the computer implemented globally accessible contact list, such as the globally accessible contact list 65, based on identifiable relationships between the first and second sets of user personal descriptors and a group of user defined rules to create a state diagram of pixie trees and a pixie community of individual users and contact users. In the exemplary embodiments, a pixie tree social networking structure provides a social client experience with many views into a developing/evolving online community, developing by categories including pixie interests, characteristics and/or content. The pixie community itself is a culmination of presence, messaging, persisted communications (posts), as well as mutual attribute ratings. Depending on the client, device and transport, the user experience could be dramatically different and yet still affect the pixie community of individual users and contact users. In exemplary embodiments, user interfaces include text supporting short message service (SMS) transports through which people participate in the GNAB provider system 20's community events via a standard cell phone. In other cases, a user interface can be a full 3D rendering graphical user interface providing a fully immersive user experience for individuals and contacts, where menu navigations are implemented by way of a pixie avatar (i.e., the pixie 300) moving from building to building, and interacting with bulletin boards, chatting with other players and/or engaging in simple board games in common rooms while the individuals and contacts, through the pixie avatars, discuss their interests and share pixie information.

Pixie traits and characteristics attributed to an individual owner of a pixie can be analogous to biblical traits and characteristics, as well as, online gaming traits and characteristics including massive multiple online role-playing games (MMORPG's) in which a large number of online players interact with one another in a virtual world. Thus, the pixie 300 can include traits and characteristics including strength, intelligence, wisdom, agility, level of dexterity, and being well-read. In exemplary embodiments the value, standing and/or empirical level of the well-read trait and/or characteristic is attributed to the individual owner of the pixie 300 and increased with each additional book a person reads. Therefore, a certain segment of individuals may compete to be at the top of the well-read global list. Other individuals and/or acquaintances may make contact decisions, based on an individual's well-read rating factor. In exemplary embodiments, the more an individual pixie ID owner consumes books and/or other reading materials, the higher the well-read attribute rating score may be that is attributed to the individual pixie ID owner. Some attribute increases may be free of charge, offered as incentives to get individuals/contacts started, but then as a person/user increases an attribute, the objective portion may be tied and/or strung together with promotional sponsors. In addition, some individuals and contacts will go on-line and virtually sit down at a table and play checkers with someone else, i.e., other individuals and/or other contacts, vicariously through the use of avatars, such as the avatar 304.

In exemplary embodiments, health is considered an attribute. A portion of an individual pixie ID owner's attribute rating score can be achieved by having the individual complete health and/or other subjective surveys, and another portion can be entered as ratings by friends of the individual pixie ID owner in the pixie community of users. A further portion of an individual pixie ID owner's attribute rating may be based on a subscription to a chain of workout facilities or purchases from health sites. In exemplary embodiments, increasing the attribute rating score/standings of the individual pixie ID owner may promote healthy habits, networking, and business opportunities. According to exemplary embodiments, part of these ratings are subjective, while other ratings are based on empirical evidence, including the number of books an individual pixie owner purchased through a sponsoring site for which the individual published a review. Other pixie traits and characteristics include, for example, charitable service, X-game success, geographical longevity, military veteran, scuba diver level of expertise, or cancer survivor status. Virtually any trait, characteristic, interest and/or content can be measured and rated and attached to corporate/commercial sponsors.

In regard to pixie owner attributes, for every branch of the pixie tree social networking structure, an individual pixie ID owner can have a corporate sponsor company. The corporate sponsor company is the default placeholder offering opportunities to purchase products directly in the interface while people interact with the community at large. As individuals consume sponsored products, participate in sanctioned events, or simply mature as individuals, their attribute points may increase. Attributes are attached, for example, to an individual's Mensa level or their IQ, or their athletic prowess. Individuals may gain higher athleticism attribute points by making the varsity team. Attribute points may even translate to jobs were people have been traditionally labeled with standing and rank including, for example, level 2 apprentice or private first class in the military.

Referring to FIG. 1 and FIG. 2, at operation transmit user contact information anonymously to contact 790 (hereafter the "operation 790"), the program 41, executed by the provider computer processor 22, causes the method 700 to instruct the provider computer processor 22 to transmit contact user information anonymously to at least one individual user and to at least one contact user from the plurality of contacts in the globally accessible contact list 65. When user and contact category information is developed, such contact user information is transmitted and/or received by the method 700 via the GNAB provider system 20 to and/or from at least one contact from the plurality of contacts in the globally accessible contact list 65, so as to share presence information of the individual user with the at least one contact user from the plurality of contact users in the globally accessible contact list 65. According to exemplary embodiments, the individual user and the contact user are authorized users.

Referring to FIG. 1, FIG. 2 and FIG. 3, at operation share user presence information 800 (hereafter the "operation 800"), the program 41, executed by the provider computer processor 22, causes the method 700 to instruct the provider computer processor 22 to share, in real time, user presence information and share portions of the first set of user personal descriptors and/or portions of the second set of user personal descriptors with the at least one contact from the plurality of contacts in the globally accessible contact list 65. In exemplary embodiments, pixies, such as the pixie 300, are easily sharable. The pixie 300 can be shared and passed by non-automated modes of communications, such as verbal information passed along by word of mouth among individuals, printed information, such as information on a paper based business card, or published by one of its identifiers. The pixie 300 can also be shared through automated electronic modes of telecommunications, such as email, dual-tone multi-frequency (DTMF) signaling used for telephone signaling, infrared, Internet protocol (IP), or cellular transports. Both the push method (i.e., sending pixie information to a waiting person and or device) and the pull method (i.e., requesting pixie information from another owner's pixie) are supported in exemplary embodiments. In all of these cases both live and cached chronologies may be available.

Sharing user presence information and either sharing portions of the first set of user personal descriptors and/or sharing portions of the second set of user personal descriptors and/or both with the at least one contact from the plurality of contacts in the globally accessible contact list 65, may be accomplished by attaching instant messaging roster states to user pixie address book personal information via the GNAB provider system 20, which includes the globally accessible contact list 65. Attaching such instant messaging roster states to user pixie address book information (i.e., the GNAB provider system 20 information) provides online and offline experiences for the individual and/or contact user within a coordinated request for information.

Other individuals, contacts/users, acquaintances, and/or business entities can add attributes points and ratings to an individual owner's pixie content as the individual pixie owner introduces his/her pixie to a wider pixie community of users/contacts. These attribute ratings are either subjective (how a pixie owner feels about himself or herself) or objective (based on purchases or consumption of sponsored goods and services). Community opinion may be another aspect associated with increasing and/or adding attributes as an individual pixie owner moves through social networks. As an individual's pixie, such as the pixie 300, is introduced out into a wider pixie community of users/contacts that is made up of online IP services as well as intrinsic networks that are specific to devices and/or transports including television (TV) or cellular transports, including cable, and satellite modalities, other people/contacts/users will be able to evaluate their perceptions of the individual pixie owner's attributes and add their opinions and additions to the individual pixie owner's attribute point/rating scheme. Therefore, the attribute ratings, scores or points could increase drastically as individual pixie owners interact with more and more friends, including interacting with a pixie tree social networking structure. Opening the individual pixie owner's attributes for public scrutiny and critique is optional, based on the characteristics and/or interests in which the individual pixie owner participates. However, opening the individual owner's pixie attributes may be a bonus to the network community and valued by others at a higher level. Therefore, such open pixies may be readily accepted and become popular, as manifested by receiving frequent visits from other contacts.

Furthermore, as an individual pixie ID owner encounters other people and/or other contacts, the other people will be able to assess their own feelings about the value of the individual pixie owner's contributions. If an individual pixie owner elects to expose his/her attributes for external ratings, then others will be able to set a point value that the others feel is accurate for the particular individual pixie ID owner. According to exemplary embodiments, these assessments are then blended with the individual pixie ID owner's own subjective assessment as well as the computer implemented GNAB provider system 20's automated objective assessment (derived from verifiable measurements such as purchased products or store/vendor participation). The assessment of the individual pixie ID owner by others may carry with it a premium metaphor since the assessment also exposes the individual pixie ID owner's attribute points to greater risk, where the pixie 300 serves as a common operational communications metaphor. If the individual pixie ID owner opens his/her attributes to being graded by others, then the individual pixie ID owner's pixie 300 can be provided with a title that others will not be able to select, hold and/or use, including, for example, Ambassador, Friend or Chief Higher ratings can lead to community positions with additional functionality. In exemplary embodiments, an individual who is highly rated by peers in a particular branch can become a local administrator for that branch and can get help to setup, for everyone else, certain settings including color or font settings, or some variation in posting rules. The forming of guilds is extremely popular in other such communities. Creating such guilds, in pixie communities of individual users and contact users, may lead to rewards granted to those individual pixie ID owners with the highest attributes in a pixie tree social networking branch.

In exemplary embodiments, the pixie 300 is a common metaphor operating on and across all transports, applications and devices, including wireless, including satellite communications, wireline, IP data, IFR, Bluetooth, as well as, program files. With a single tag, individuals may exchange and/or share information about themselves with confidence, convenience and privacy. Because the pixie service will grow with the individual, the attractiveness and/or loyalty for an entity will grow over time. This vesting of pixie communications may make the entity and/or provider company the only company an individual user will want to do business with (i.e., the pixie provider service company).

In exemplary embodiments, the pixie ID associated with the pixie 300 information provides security in accessing the pixie 300 information. Through ID separation, the pixie ID may be the only data-point that needs to be shared outside the security perimeter of the company and/or of an individual's contact location in a data model. In accordance with exemplary embodiments, all information exposed to people in the GNAB provider system 20 will be as a result of a read-only view into the data model, and this view will only be made available to people that have logged-in to their own account first and have an individual's permission to view a certain prescribed portion of the individual's data. When a viewer/acquaintance chooses to alter the data presented by the pixie 300 of another person and/or individual, that data may become a delta that is associated only with the viewer/acquaintance in his/her own account with the GNAB provider system 20. Thus, an individual pixie owner is completely in charge of his/her own information. In order for an individual to access and modify any of his/her own pixie information, the individual must first obtain full authentication and authorization through the use of security credentials, which may include cryptographic credentials through the GNAB provider system 20, and/or from the GNAB provider system 20 provider/user, in accordance with exemplary embodiments.

Referring again to FIG. 1 and FIG. 2, at an operation provide at least one tier of access information 810 (hereafter the "operation 810"), the program 41, executed by the provider computer processor 22, causes the method 700 to instruct the provider computer processor 22 to provide varying levels of access information to the at least one contact from the plurality of contacts in the globally accessible contact list 65, which is computer implemented and based on the group of user defined rules.

Varying levels of access information include providing, by the method 700 and the GNAB provider system 20, at least one tier of access information from a plurality of tiers of access information and providing portions of the first set of user personal descriptors and providing portions of the second set of user personal descriptors, so as to share presence information of the user with contacts from the plurality of contacts in the globally accessible contact list 65, based on the group of user defined rules. Combining the at least one tier of access information with portions of the first and second sets of user personal descriptors may form multiple views in real time of the individual user's personal descriptors, which are transmitted over the communications network 50 by the method 700 and the GNAB provider system 20 to another or other individual users and/or contacts, in the form of the pixie 300 of the individual user, where the individual user is the authorized user and the pixie 300 of the individual user is created by associating and combining the first and second sets of user personal descriptors in the personal information and interests 302 table with the avatar 304.

Referring to FIG. 1 and FIG. 2, at an operation return/end 820 (hereafter the "operation 820"), the program 41, executed by the provider computer processor 22, causes the method 700 to return to any of the above operations of the method 700 to continue iteratively processing and performing said operations of the method 700 or the program 41 can direct the method 700 to end.

Thus, in exemplary embodiments, creating a pixie, such as the pixie 300, by an individual fosters a positive experience for the individual creator of the pixie 300 and can instantly reward the individual pixie owner. Individuals and/or acquaintances will have meaningful communications within the first few minutes of interaction with the globally accessible contact list 65 within the GNAB provider system 20. The work of an individual may be saved and easily retrieved for later use.

According to further exemplary embodiments, a method and system allows optimization of the populating of a user/owner-centric virtual address book, calling card and/or business card with contact information tied to a roster state diagram of instant messaging communications. The method and system of optimizing may be implemented through the use of, e.g., business sprites, intelligent information brokers and automated and/or animated representative talkers, with easily sharable identifiers that provide complete anonymity and still manage communications brokering through the provision of a "virtual calling card" that includes certain information that is only provided to certain authorized persons, including certain personality aspects of the owner to foster community interaction and achievement, including interactions involving massive multiple online role-playing interactions and fun and exciting social networking experiences. Furthermore, a method and system of optimizing with encryption techniques and other security measures, including passwords and passcodes and ID's may exclude certain personal contacts from certain information available in the "virtual calling card" to promote secure single instances of common data to reduce or eliminate duplication/synchronization issues, while maintaining owner-centric control of data represented in other individual's address books. Thus, personas that present different contact information and data to different groups of individuals may be included and/or excluded. Further, according to exemplary embodiments, methods and systems are provided for optimizing the anonymous provision of personal contact information having certain restrictions on use, where the personal contact information includes presence indications for communicating via a cell phone, text messaging, facsimile or online e-mail during or even before communications efforts are attempted, including write-ahead and speak-ahead functionality. Also, a method and system that automatically create and store an individual's personal contact information in a central location that is accessible globally may be included.

Thus, according to a second exemplary embodiment, a method and system that optimize the provision of communications pathways of a virtual calling card that provides global access, presence information, and rule restrictions based on owner-centric restrictions are provided. The method and system optimize the provision of a global calling card that facilitates communication by a user, by way of a pixie, while allowing the user to restrict accesses to certain information based on the particular recipient of the card.

Referring to FIGS. 10 and 11, a personal descriptor communications pathways method 70 (herein referred to as the "method 70") and the global network address book provider system 20, which implements the method 70, create multiple communications pathways for user personal descriptors.

Referring to FIG. 1, the GNAB provider system 20 described in the first embodiment includes the provider computer processor 22, which contains the memory 24. Also, residing in the provider computer processor 22 is the program unit 40, containing the program 41.

Again referring to FIG. 1, an instant messaging roster state database 69 is communicatively coupled to the GNAB provider system 20 over the communications network 50, which is communicatively coupled to the GNAB provider system 20 via the provider network interface 28.

In exemplary embodiments, the GNAB provider system 20 and the method 70 can be implemented in software (e.g., firmware), hardware or a combination of both, as described in the first embodiment. In exemplary embodiments, the method 70 is implemented in software, as an executable program, such as the program 41 and is executed by the provider computer processor 22. The memory 24, the instant messaging roster state database 69, as well as the networked database 60, which contains the globally accessible contact list 65, can include any one or combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CD-ROM or FLASH memory) magnetic tape, disk, diskette, cartridge, cassette and/or optical memory.

Referring to FIG. 10 and FIG. 1, at an operation start 71, the GNAB provider system 20 receives a signal from an operator and/or individual user and/or a contact user input device including the input device 29, which activates and initiates the program 41. The method 70 may be stored as executable program code on a computer executable medium. Once activated, the program 41 performs other operations of the method 70 from selection signals received from the input device 29, causing the program 41 to be executed by the provider computer processor 22 to perform the operations of the method 70, thereby calling the first algorithm A31 and/or the second algorithm A32 up to the nth algorithm An (similarly described in the first embodiment), to perform operations and sub-operations of the method 70 of creating user personal descriptors and multiple pixie views and, as described herein the second exemplary embodiment, optimizing multiple communications pathways of user personal descriptor (i.e., pixies, such as the pixie 300).

Referring again to FIG. 10 and FIG. 1, at an operation receive request for pixie access 72 (hereafter referred to as the "operation 72"), the program 41, executed by the provider computer processor 22, causes the method 70 to instruct the provider computer processor 22 to receive from and/or provide to, a contact user, a request for access to a pixie, such as the pixie 300 of an individual pixie owner listed in the globally accessible contact list 65 of the GNAB provider system 20.

Referring to FIG. 10 and FIG. 1, at a notify individual pixie owner of request for pixie access operation 73 (hereafter referred to as the "operation 73"), the program 41, executed by the provider computer processor 22, causes the method 70 to notify the individual pixie owner of the request, from the contact user, for access to the pixie, such as the pixie 300 of the individual pixie owner, to enable sharing of contact information between the pixie owner and the contact user (i.e., contact seeker) over the communications network 50. The sharing of information can be anonymous. The contact information is categorized, based on identifiable relationships between user personal descriptors and a group of user defined rules defined by the plurality of individual users and/or the plurality of contact users. Such categorized user contact information is transmitted and/or received to and/or from an at least one of the plurality of contacts, either the individual user and/or the contact user listed in the globally accessible contact list, so as to share presence information. According to exemplary embodiments, the plurality of individual users and the plurality of contact users are authorized users providing varying levels of access information, based on the group of user defined rules.

Again referring to FIG. 10 and FIG. 1, at an operation receive signal from individual pixie owner permitting access or rejecting access 74 (hereafter referred to as the "operation 74"), the program 41, executed by the provider computer processor 22, causes the method 70 to instruct the provider computer processor 22 to receive a signal from the individual pixie owner over the communications network 50, where the signal designates either permission for the contact user to access the pixie, such as the pixie 300 of the individual pixie owner or designates, by the individual pixie owner, denial of permission for the contact user to access the pixie 300 of the individual pixie owner, thus rejecting access to the pixie 300. Permitting and/or rejecting (i.e., denial of) access may be based on adding the contact to an instant messaging roster state database, where the status of individual users and contacts is entered and coordinated and where, in a plurality of fields and/or rows in a plurality of instant messaging roster state database entry locations in an instant messaging roster state database, a state condition is entered in a first state filed of the instant messaging roster state database. The state status indication of a level of a subscription type access condition is entered in a field for an individual user, and a second state condition is entered in a second state field of the instant messaging roster state database. This second state condition indicates the level of the subscription type access status/condition in a field for the contact user.

In exemplary embodiments, pixie information content may be automatically updated, and pixie information may be automatically populated and/or pre-populated into contact lists of the GNAB provider system 20. According to exemplary embodiments, as an individual moves from one geographical location to another or as the individual changes services, changes jobs, experiences family changes or grows older, the pixie data of the individual is automatically updated by the GNAB provider system 20 and automatically populated into computer implemented contact lists, such as the globally accessible contact list 65, (based on data mining by the provider of the GNAB provider system 20) to simplify the updating process of the individual's latest pixie information. Thus, the individual user does not have to update his/her pixie information manually, although the individual user may manually update and edit his/her pixie information, if desired and/or required, thus, encouraging frequent use of the pixie by individual users and contacts. As an individual's core pixie information is updated, the individual user may be provided with a choice to share this updated information with anyone for whom the individual user has shared his/her pixie information with in the past. The selected choice can be manifested by a total listing of the pixie information or by a characteristic group or an interest group or a custom group classification or unbundled piecemeal/piecewise informational groupings including updating family and next-door neighbor information, while information about friends may be excluded. Thus, the individual owner of the pixie, such as the pixie 300, remains in control of his or her own data even though a view of that information appears in someone else's user interface of the GNAB provider system 20. The caller, information seeker and/or contact user can select a desired chronological communications modality including communicating live and in real-time, such as making a phone call or a communication modality can be selected in a cached way, such as with voice mail; also, the information seeker can select a mode including audio/visual, audio only, text only, and/or visual only.

Referring to FIG. 3, and as also described in the first embodiment, the pixie 300 includes a combination of the personal information and interests 302, as well as the avatar 304. Exemplary embodiments contained herein describe a smart avatar as representing the variety of interests, characteristics, images and content information that make up the profile of an individual, where the avatar 304 includes representations of various dimensional images of an individual or a text construct of the individual.

Referring to FIG. 10, at an add contact user to an instant messaging roster state database operation 75 (hereafter referred to as the "operation 75"), the program 41, executed by the provider computer processor 22, causes the method 70 to instruct the provider computer processor 22 to add information and/or data about the contact user to the instant messaging roster state database 69. Also, the status of individual users and contact users are received and/or entered, coordinated and arranged in a plurality of blocks of fields (these fields may also be characterized interchangeably as rows) (including field/row 92, field/row 94 and field/row 96 illustrated in FIGS. 4-9) in a plurality of instant messaging roster state diagram 90 database entry locations in the instant messaging roster state database 69, where the information and/or data include state conditions. A state condition is entered in a first state field/row, such as the field/row 94, of the instant messaging roster state database 69, indicating a level of a subscription type access condition for an individual user 9 (i.e., a first user or USER 1), and a second state condition is entered in a second state field and/or row, such as the field/row 96, of the instant messaging roster state database, indicating the level of the subscription type access condition for a contact user (i.e., a second user or USER 2). In exemplary embodiments, the combination of pixie information, such as information associated with the pixie 300, manipulated by the global network address book system 20, in conjunction with instant messaging roster state charting, provides information control for individuals and/or contact users. In the pull model of querying for information, an acquaintance, either a prior acquaintance or a newly met acquaintance, requests access to the pixie of an individual pixie owner, such as the pixie 300 listed in the globally accessible contact list 65 of the GNAB provider system 20. The individual pixie owner is notified of the access request based on the individual pixie owner's own settings. In exemplary embodiments, the individual pixie owner can permit sharing of the individual pixie owner's information, but only the type of persona information that the individual pixie owner desires to share; for example with friends, and only if the acquaintance agrees and permits sharing his/her in-kind or other information, based on conditions, with the individual pixie owner, as well. A message in response to the access request notifies the individual pixie owner that the acquaintance has agreed to share his/her information, if the individual pixie owner agrees to share information. The individual pixie owner may select the share my friend information category and the new contact information is available to both the individual pixie owner, as well as to the acquaintance via the GNAB provider system 20.

Referring to FIG. 10 and FIG. 1, at an operation notify contact user of access status 76 (hereafter the "operation 76"), the program 41, executed by the provider computer processor 22, causes the method 70 to instruct the provider computer processor 22 to notify the contact user of the designation of either permitting access to the contact to access the pixie 300 of the individual personal descriptor/pixie individual owner or notify the contact user of the designation of rejecting access by the individual owner.

In exemplary embodiments, the computer system of the newly met acquaintance may retrieve any information allowed through the use of instant messaging states (IM States) for the owner of the pixie identifier.

Referring to FIG. 10 and FIG. 1, at an operation share access to pixie with contact user when permitted 77 (hereafter the "operation 77"), the program 41, executed by the provider computer processor 22, causes the method 70 to instruct the provider computer processor 22 to share, with the contact user, access to the pixie, such as the pixie 300, by the individual pixie owner, when the signal received by the individual pixie owner is a designation of permitting access to the pixie of the individual pixie owner.

Referring to FIG. 10 and FIG. 1, at an operation reject access to pixie when permission denied 78 (hereafter the "operation 78"), the program 41, executed by the provider computer processor 22, causes the method 70 to instruct the provider computer processor 22 to reject sharing, with the contact, access to the pixie, such as the pixie 300, by the individual pixie owner, when the signal received from the individual pixie owner is a designation of rejecting access. In the alternative, when the GNAB provider system 20 designates access granted, i.e., when the contact/user obtains access to the pixie 300, the pixie owner and/or the contact user exchange information to perform completing social interactions between the pixie owner and the contact user, based on pixie tree social networking personal information and interests including traits, ratings, presence information, characteristics and attributes. In addition, completing social interactions between the pixie owner and the contact user of the GNAB provider system 20, may include forming socially desirable associations, such as guilds. Also, the social interactions may include bestowing special status upon members of established associations and/or guilds, where the special status and or forming and/or obtaining membership in regard to organizations, associations and/or guilds may be provided as rewards granted to individual pixie owners with distinguishing attributes in a pixie tree social networking branch structure. In addition, completing social interactions may include completing business interactions between the pixie owner and the contact user, based on business networking personal information and interests, as represented by personal information and interests 302, as illustrated in FIG. 3. In exemplary embodiments, a pixie tree social networking structure provides a social client experience with many views into a developing/evolving online community, developing by categories including pixie interests, characteristics and/or content. The community itself is a culmination of presence information, messaging, persisted communications (posts), as well as mutual attribute ratings. When the individual pixie owner user information and the contact user category information are developed, such user contact information is transmitted and/or received by the method 70 and the GNAB provider system 20 to and/or from an at least one contact user from the plurality of contacts in the computer implemented globally accessible contact list so as to share presence information of the user with the at least one contact from the plurality of contacts in the computer implemented globally accessible contact list, such as the globally accessible contact list 65, where the at least one individual user and the at least one contact user are authorized users. Depending on the client, device and transport, the user experience could be dramatically different and yet still affect the one pixie community of individual users and contact users. In the exemplary embodiments, user interfaces include text supporting SMS transports through which people participate in the GNAB provider system 20's community events via a standard cell phone. In other cases, the user interface is a full 3D rendering graphical user interface providing a fully immersive user experience for individuals and contacts. In addition, menu navigations are presented as an animated pixie avatar (such as the pixie 300) moving from building to building, and interacting with bulletin boards, chatting with other players and/or engaging in simple board games in common rooms while the individuals and contacts, through pixie avatars, such as the avatar 304, discuss their interests and share pixie information on behalf of the users.

Thus, in exemplary embodiments, creating a pixie, such as the pixie 300. by an individual fosters an enjoyable and rewarding experience for the individual creator of the pixie and can provide instant gratification to the individual pixie owner. Individuals and/or acquaintances will have substantive enjoyable communications experiences within the first few minutes of interaction with the globally accessible contact list 65 within the computer implementation of the GNAB provider system 20. A goal of claiming a pixie ID and entering an individual's immediate contact information includes obtaining at least one fun aspect for the users. The individual user is assured that his/her individual work is saved and that he/she can come back at any time in the future to add more pixie information to his/her pixie, such as the pixie 300.

Referring to FIG. 10, FIG. 1 and FIG. 3, at an operation share access to pixie includes use of a pixie-talk communications broker 79 (hereafter the "operation 79"), the program 41, executed by the provider computer processor 22, causes the method 70 to instruct the provider computer processor 22 to include using a pixie-talk communications broker for sharing text and/or voice communications, in the operation of sharing, with the contact user, access to the pixie 300 by the individual pixie owner.

Referring again to FIG. 10, FIG. 1 and FIG. 3, at an operation share access to pixie includes rendering animation 80 (hereafter the "operation 80"), the program 41, executed by the provider computer processor 22, causes the method 70 to instruct the provider computer processor 22 to share, with the contact user, access to the pixie 300 by the individual pixie owner, a rendering of the pixie 300 as an automated, animated, graphical, customized business card changing its presentation depending on the audience that the individual owner of the pixie wants to address, and programmatically changing the rendering according to how a person views the rendering, based on the person moving from one of a first social group to a second social group and/or moving from a first business organization to a second business organization.

In exemplary embodiments, pixie IDs promote ID separation (i.e., jettisoning an individual's pixie ID) and linking pixie IDs of individuals. According to exemplary embodiments, a pixie ID only represents the individual pixie owner's identity such that the pixie ID is only associated via a relationship with a primary key in a database and is not, itself the primary key. Therefore, an individual customer, and/or user can change his/her pixie ID as easily as he/she might change his/her phone number. All of the underlying relationships with address book entries for other people will be maintained at the primary key level and not at the pixie ID level. Individuals change their phone numbers for many reasons, not the least of which is to avoid annoying callers. Also, in regard to changing phone numbers, there are risks of losing wanted calls from friends and acquaintances. In exemplary embodiments, losing the good and bad contacts does not happen with limiting access to pixie IDs. An individual/person can change his/her pixie ID, and elect to update all of the contacts that reference the pixie ID in the individual's address books. An individual pixie owner can selectively lose only those people the individual pixie owner wishes to lose by changing his/her pixie ID. Since a relationship to the address books of others is based on the primary key and not the pixie ID, a recycled, re-purposed returned/decommissioned, pixie ID can be used by another customer without the annoying "wrong number" calls of the old fashioned, recycled, re-purposed, returned and/or decommissioned phone numbers, in regard to communications brokering. An individual/user and/or person cannot use a pixie ID to contact another individual contact unless the individual/user seeking contact has first gone through the IM roster state charting interactions with the individual and/or contact users to be contacted.

In exemplary embodiments, the combination of the pixie 300 information, the global network address book provider system 20 and instant messaging roster state charting provide superior information control for individuals. In the pull model, an acquaintance or a newly met acquaintance requests the pixie, such as the pixie 300, of an individual pixie owner listed in the address book of the acquaintance and/or newly met acquaintance. The individual pixie owner is notified of the request based on the individual pixie owner's own settings (this is a deviation from the traditional IM model). The individual elects to permit or reject the request for information from the acquaintance. Through the use of pixies, the individual can also elect to permit information access with conditions (a further change from the IM model). For example, the individual pixie owner can permit sharing of the individual pixie owner's information, but only, for example, the type of information that the individual pixie owner shares with friends (i.e., use of persona), and only if the acquaintance agrees and permits sharing his/her in-kind or other information with the individual pixie owner, as well (i.e., use of condition). The message may return to the individual pixie owner that the acquaintance has agreed to share their information if the individual pixie owner agrees to share information. Thus, the individual pixie owner may select the share my friend information category and the new contact information appears in both the individual pixie owner's address listing in the GNAB provider system 20, as well as the acquaintance's (i.e., contact user) address listing in the GNAB provider system 20. The pixie state system supports multiple chronologies including real-time sharing of pixie information and answering cached requests to share pixie information. Thus, the pixie state system incorporates portions of the IM roster state system model by supporting online and offline experiences within the same request. Therefore, whatever condition exists, either online and/or offline will be the experience of the contact requester.

The following tables (i.e., Table 1, Table 2 and Table 3) contain key captions that describe instant messaging roster charting entries in state diagrams, such as the diagram 90, illustrated in FIGS. 4-9. Table 1 is directed to keys and/or legends describing status entries that can be made in four subscription categories, in regard to the instant messaging roster state database 69, concerning each of at least two individuals, users and/or contact users (USER 1 and USER 2). A plurality of instant messaging (IM) roster state diagrams 90 illustrated in FIGS. 4-9 represent locations in the instant messaging roster state database 69, where the status of individual users and/or contact users are coordinated and arranged in fields and/or rows. A field, row and/or block where the status of various states (i.e., State; Final State and Temporary State) are entered and coordinated, in regard to accessing a pixie, such as the pixie 300 is illustrated as block 92 in FIGS. 4-9. A field where a variety of key captions are entered, arranged, manipulated and coordinated, indicating various levels of user access status (i.e., Subscription Type, Ask Status, Subscribe, Hidden, Null and Delete) in regard to access to a pixie such as the pixie 300 by a first individual user is illustrated as the field/row 94 in FIGS. 4-9. A field where varieties of key captions are entered and coordinated, indicating various levels of individual user and/or contact user access status (i.e., Subscription Type, Ask Status, Subscribe, Hidden, Null and Delete) in regard to accessing the pixie 300 by a second individual user and/or contact is illustrated as the field/row 96 in FIGS. 4-9.

TABLE 1

Instant Messaging Roster Charting Database Key

| | | Subscription Type | Ask Status | Subscribe | Hidden |
|---|---|---|---|---|---|
| / Null | User 1 | | | | |
| / Delete (d) | User 2 | | | | |

TABLE 2

Instant Messaging Roster Charting Subscription Type Key

| | |
|---|---|
| Subscription_Type = | None/To/From/Both/Remove/Null |
| Ask_Status = | Subscribe/Unsubscribe/Null |
| Hidden = | Yes/No |
| Subscribe = | Normal Subscription Request (NSR)/Null |

TABLE 3

Instant Messaging Roster Charting Status Key

| | |
|---|---|
| Sn | State |
| | Final State |
| Sn | Temporary State |

In exemplary embodiments, pixies require one individual's personal contact information to be listed in the GNAB provider system 20 and then the other contact/person to give permission to be added to the address book as per Instant Messenger State rules (with the addition of persona concepts). However, in regard to an additional computer implementation of the GNAB provider system 20, the service provider's business objective might be to persuade a content-provider business to forego receiving the return information in order to get more people to add contact information, for the business, to the address book of the GNAB provider system 20. This provides powerful sales tools, allowing customers to see presence information for the business set up as a personalized yellow pages implementation, as well as, receive coupon offers directly in the contacts lists of the business, such as in the address books of the GNAB provider system 20. This may require the roster state diagram of instant messaging communications to provide for a one-way presence and placement business sprite. This one-way business sprite may be added to various new forms of computer-implemented communications including the form of a widget on a web site that is easy for webmasters to add to their own code and/or the form of infrared scanning and/or reading implementations at grocery store checkout lines or sprite codes on business cards, where sprites include independent graphic objects moving randomly and freely across video screens under the influence of their own bit plane memory area. The business sprite is also used to request return information, including a message requesting the customer to "Please allow us to add you to our records so that we can let you know of other great offers!" Thus, based on the GNAB provider system 20 computer implemented provider business objective, the business customer/individual/contact may be charged a premium for such a request by the GNAB provider system 20. In addition, a business may pay varying amounts for more immediate attention and would be able to purchase full-cycle advertising results reports at a premium from the GNAB provider system 20.

In exemplary embodiments, coupons in an individual's and/or contact's address book can arrive via the alerts mechanism found in the basic service calling area (BSCA) messaging component. The alerts may either be passive (appearing for a fixed time like 30 days) or active (notifying the customer that they have new coupons), based, e.g., on rules the customer/user sets up.

In exemplary embodiments, the GNAB provider system 20 and BSCA services that facilitate the exchange of pixie information are transport independent and can support multiple transports including at least: IP, telephony, cellular, IP multimedia subsystem infrastructure, instant messaging services, extensible messaging and presence protocol (XMPP), and (SMS) protocol. This means that an individual's pixie information can be shared with anyone. Further, this means that the sharing of the individual's pixie information adds value to the experience of the recipient of the shared pixie information, for any transport for which the individual uses the GNAB provider system 20.

Furthermore, in exemplary embodiments, sharing information by an individual's pixie ID provides anonymous communications. Customer acceptance and customer adoption of sharing pixie information services are critical factors, which can indicate success of the GNAB provider system 20. By using the GNAB provider system 20 of sharing pixie information, individuals can permit people to contact them through the use of an anonymous and/or expendable identity. This anonymity and/or expandability of shared information facilitates customer acceptance and wide scale customer adoption of the GNAB provider system 20 services. People want to interact socially through all the new electronic communities available to them, but are afraid of pitfalls and risks including identity theft and/or stalkers. Anonymously sharing pixie IDs will remove these risks. Thus, the pixie ID enhances the concept of communications modality in that it now provides a handle that can be used in place of personal information like a name or telephone number. This provides the ability for greater anonymity of the receiver of information, as well as the sender of information in communications transmitted via the GNAB provider system 20.

In exemplary embodiments, another provider objective in implementing the GNAB provider system 20 is to utilize a number of different platforms and transports and increase service utilization, as well as advertising opportunities. According to exemplary embodiments, the provider user of the GNAB provider system 20 reduces the cost of monthly services to individuals and/or contacts and/or customers when the individuals and/or contacts and/or customers agree to a heightened exposure to advertising. In this advertising model example, the provider user of the GNAB provider system 20 earns $2.00 for every $1.00 reduction on a monthly services bill of the individuals and/or contact customers when the product user placement and advertising model is considered from an overall architectural standpoint in the design.

The pixie concept may support many unique and innovative product placement opportunities but too many may lose participants' interest. Therefore, a slider incentive may be provided to encourage individual users and/or contact users to voluntarily increase their exposure to product placement opportunities with a perceived reward of monthly cost savings. Thus, a business may pay the provider user of the GNAB provider system 20 varying amounts for more immediate attention as well as being able to purchase, from the provider user, full-cycle advertising results reports at a premium. To accomplish this, the provider user of the GNAB provider system 20 may design the GNAB provider system 20 to identify a core functionality set available to all devices, and then an enhanced functionality set, which is accessed through selected transport devices. Thus, individuals and contacts alike will be able to see who else is online, send a message to someone directly, post a grade on someone else's attribute, or post a reply to someone else. Because an individual pixie owner's pixie already contains information regarding their interests, characteristics, and/or content, then where the individual enters into the pixie community of pixie users, i.e., what node or area of the pixie community of pixie users by which the individual enters the community may be determined by the communications network 50. This gives the individual pixie owners/users the best opportunity of accessing some content of other contact users that will quickly interest the individual. This approach differs from the root hierarchy approach that leaves individuals and contacts guessing about how to navigate the GNAB provider system 20. Once in the pixie tree social networking structure, the ability of an individual to travel quickly and efficiently to different branches and explore freely will be obvious and easy. Therefore, if the GNAB provider system 20 determines incorrectly on the initial entry point in the communications network 50, then the individual pixie owner/user will be able to adjust and enter at a correct entry point and not repeat the mistake. According to exemplary embodiments, the GNAB provider system 20 can learn the default desired behavior of the users by utilizing knowledge base artificial intelligence software applications including expert systems, i.e., rule based systems, model-based reasoning, fuzzy logic decision trees and neural networks involving statistical estimators, neural models or neuro-fuzzy models, and/or pruning methods.

Referring again to FIG. 10 and FIG. 1, at an operation share access to pixie includes performing business interactions 81 (hereafter the "operation 81"), the program 41, executed by the provider computer processor 22, causes the method 70 to instruct the provider computer processor 22 to perform and/or complete business interactions between the pixie owner individual user and the contact user including creating revenue income opportunities for the provider user of the GNAB provider system 20 and providing revenue income opportunities to a content provider and providing revenue savings opportunities to an individual user and/or a contact user. The revenue opportunities for the provider user of the GNAB provider system 20 may include charging the individual user and the contact user a premium by the provider user of the GNAB provider system 20 for a request to broadcast advertisements in a sprite, charging the pixie owner individual user and/or the contact user a premium for a vanity pixie ID, charging an advertising provider a premium for full-cycle advertising reports, and charging the content provider a premium for more immediate attention from consumers to the advertising content of the content provider. The revenue opportunities for the content provider may include a targeted self-qualified audience, and the revenue opportunities for the individual user and the contact user may include reduced monthly service costs, when the pixie owner individual user and the contact user agree to heightened exposure to advertising promotions.

Referring to FIG. 10 and FIG. 1, at an operation return/end 82 (hereafter the "operation 82"), the program 41, executed by the provider computer processor 22, causes the method 70 to return to any of the above operations of the method 70 to continue iteratively processing and performing the operations of the method 70 and/or the program 41 can direct the method 70 to end.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A non-transitory computer readable medium having computer executable instructions providing multiple pathways of user personal descriptors in a form of an avatar combined with personal information and interests of a plurality of users over a computer network, the computer executable instructions executed by a provider computer processor causing the provider computer processor to perform a method comprising:
    receiving a globally accessible contact list of the plurality of users in a database;
    automatically populating a dynamic repository with at least a first set of user personal descriptors and a second set of user personal descriptors of an at least one of an individual user personal descriptor owner and a contact user of the plurality of users;
    receiving contact information anonymously from the at least one of the individual user personal descriptor owner and the contact user;
    storing, in the dynamic repository, contact information received from the at least one of the individual user personal descriptor owner and the contact user;
    receiving, from the contact user, a request for access to a user personal descriptor of the individual user personal descriptor owner;
    notifying the individual user personal descriptor owner of the request, from the contact user;
    receiving, by the provider computer processor, a signal from the individual user personal descriptor owner including one of a designation of permitting access by the contact user to the user personal descriptor and a designation of rejecting access by the contact user to the user personal descriptor of the individual user personal descriptor owner, based on:
        adding an at least one of an individual user and the contact user to an instant messaging roster state database, wherein a status of individual users and contact users are entered and coordinated, and
        notifying the contact user of one of the designation of permitting access and the designation of rejecting access by the individual user personal descriptor owner; and
    performing one of:
        rejecting sharing, with the contact user, access to the user personal descriptor of the individual user personal descriptor owner, when the signal received is the designation of rejecting access, and
        sharing with the contact user, access to the user personal descriptor of the individual user personal descriptor owner, when the signal received is the designation of permitting access, wherein when the contact user obtains access to the user personal descriptor, one of the individual user personal descriptor owner and exchange information of the contact user to perform completing one of social and business interactions between the individual user personal descriptor owner and the contact user.

2. The non-transitory computer readable medium according to claim 1, wherein sharing with the contact user, access includes providing anonymously in real time over the computer network an at least one tier of access information of a plurality of tiers of access information, based on a group of user defined rules, and sharing a third set of user personal descriptors with at least one of the individual user and the contact user, wherein the third set of user personal descriptors includes audio, video, text and still graphic representations, previously granted information, and wherein the third set of user personal descriptors is combined with the avatar to form a smart avatar, which defines a personality of the at least one of the individual user and the contact user.

3. The non-transitory computer readable medium according to claim 2, wherein computer executable instructions are executed by the provider computer processor causing the provider computer processor to perform the method further comprising: categorizing the at least one of the individual user and the contact user of the plurality of users listed in the globally accessible contact list, based on identifiable relationships between user personal descriptors and the group of user defined rules, to create a state diagram of user personal descriptor trees and stringing together a community of the individual users and the contact users.

4. The non-transitory computer readable medium according to claim 2, wherein sharing with the contact user, access includes sharing user presence information with the at least one of the individual user and the contact user.

5. The non-transitory computer readable medium according to claim 4, wherein sharing user presence information further includes attaching instant messaging roster states to persona information of the smart avatar of the at least one of the individual user and the contact user, wherein the persona information is included in an address book.

6. The non-transitory computer readable medium according to claim 5, wherein user presence information includes time of day or night when the at least one of the individual user and the contact user are available and logged on and can see information and add information to the address book, and wherein the address book is a global network address book.

7. The non-transitory computer readable medium according to claim 5, wherein attaching instant messaging roster states to persona information provides online and offline experiences for the at least one of the individual user and the contact user, within a same request for access.

8. The non-transitory computer readable medium according to claim 2, wherein audio information, video and text representations include descriptions of personality traits, contact information, and preferences.

9. The non-transitory computer readable medium according to claim 8, wherein audio information is a common denominator for communicating between at least the individual user and the contact user.

10. The non-transitory computer readable medium according to claim 2, wherein the smart avatar further defines a pixie of the at least one of the individual user and the contact user, and wherein the pixie of the at least one of the individual user and the contact user is rendered as an animation which is transmitted over the computer implemented communications network, in association with a pixie ID which is a communications broker permitting communications between at least the individual user and the contact user.

11. The non-transitory computer readable medium according to claim 10, wherein the pixie of the at least one of the individual user and the contact user represents personal characteristics, personality traits, contact information, preferences including likes and dislikes, gift registries, favorite colors, favorite flowers, favorite sports activities favorite teams, coupon registry information, business card information disbursement, wish lists and presence information.

12. The non-transitory computer readable medium according to claim 11, wherein the individual user and the contact user are authorized users.

13. A computer implemented method of providing multiple pathways of user personal descriptors in a form of an avatar combined with personal information and interests of a plurality of users over a computer network, the computer implemented method comprising:
receiving a globally accessible contact list of the plurality of users in a database;
automatically populating a dynamic repository with at least a first set of user personal descriptors and a second set of user personal descriptors of an at least one of an individual user personal descriptor owner and a contact user of the plurality of users;
receiving contact information from the at least one of the individual user personal descriptor owner and the contact user;
storing, in the dynamic repository, contact information received from the at least one of the individual user personal descriptor owner and the contact user; receiving, from the contact user, a request for access to a user personal descriptor of the individual user personal descriptor owner;
notifying the individual user personal descriptor owner of the request, from the contact user;
receiving, by the provider computer processor, a signal from the individual user personal descriptor owner including one of a designation of permitting access by the contact user to the user personal descriptor and a designation of rejecting access by the contact user to the user personal descriptor of the individual user personal descriptor owner, based on:
adding an at least one of an individual user and the contact user to an instant messaging roster state database, wherein the status of individual users of contact users are entered and coordinated, and
notifying the contact user of one of the designation of permitting access and the designation of rejecting access by the individual user personal descriptor owner; and
performing one of:
rejecting sharing, with the contact user, access to the user personal descriptor of the individual user personal descriptor owner, when the signal received is the designation of rejecting access, and
sharing with the contact user, access to the user personal descriptor of the individual user personal descriptor owner, when the signal received is the designation of permitting access, wherein when the contact user obtains access to the user personal descriptor, one of the individual user personal descriptor owner and exchange information of the contact user to perform completing one of social and business interactions between the individual user personal descriptor owner and the contact user.

14. The computer implemented method according to claim 13, wherein sharing with the contact user, access includes providing anonymously in real time over the computer network an at least one tier of access information of a plurality of tiers of access information, based on a group of user defined rules, and sharing a third set of user personal descriptors with at least one of the individual user and the contact user, wherein the third set of user personal descriptors includes audio, video, text and still graphic representations, previously granted information, and wherein the third set of user personal descriptors are combined with the avatar to form a smart avatar, which defines a personality of the at least one of the individual user and the contact user.

15. A computer system providing multiple pathways of user personal descriptors in a form of an avatar combined with personal information and interests of a plurality of users over a computer network, the system comprising:
a provider computer processor including a dynamic repository, and a program unit, wherein the provider computer processor is cooperatively coupled over the computer network to a plurality of networked computers operable by the plurality of users;
a networked database including a globally accessible contact list of the plurality of users cooperatively coupled over the computer network; and
a computer executable program residing in the program unit, wherein the computer executable program when executed by the provider computer processor causes the provider computer processor of the computer system to perform a method comprising:
receiving the globally accessible contact list of the plurality of users in a database,
automatically populating the dynamic repository with at least a first set of user personal descriptors and a second set of user personal descriptors of an at least one of an individual user personal descriptor owner and a contact user of the plurality of users,
receiving contact information anonymously from the at least one of the individual user personal descriptor owner and the contact user,
storing, in the dynamic repository, contact information received from the at least one of the individual user personal descriptor owner and the contact user,
receiving, from the contact user, a request for access to a user personal descriptor of the individual user personal descriptor owner,
notifying the individual user personal descriptor owner of the request, from the contact user,
receiving, by the provider computer processor, a signal from the individual user personal descriptor owner including one of a designation of permitting access by the contact user to the user personal descriptor and a designation of rejecting access by the contact user to the user personal descriptor of the individual user personal descriptor owner, based on:
adding an at least one of an individual user and the contact user to an instant messaging roster state database, wherein a status of individual users and contact users are entered and coordinated, and notifying the contact user of one of the designation of permitting access and the designation of rejecting access by the individual user personal descriptor owner, and performing one of:

rejecting sharing, with the contact user, access to the user personal descriptor of the individual user personal descriptor owner, when the signal received is the designation of rejecting access, and sharing with the contact user, access to the user personal descriptor of the individual user personal descriptor owner, when the signal received is the designation of permitting access, wherein when the contact user obtains access to the user personal descriptor, one of the individual user personal descriptor owner and exchange information of the contact user to perform completing one of social and business interactions between the individual user personal descriptor owner and the contact user.

16. The computer system according to claim 15, wherein sharing with the contact user, access includes providing anonymously in real time over the computer network an at least one tier of access information of a plurality of tiers of access information, based on a group of user defined rules, and sharing a third set of user personal descriptors with at least one of the individual user and the contact user, wherein the third set of user personal descriptors includes audio, video, text and still graphic representations, previously granted information, and wherein the third set of user personal descriptors are combined with the avatar to form a smart avatar, which defines a personality of the at least one of the individual user and the contact user.

17. The computer system according to claim 15, wherein the computer executable program when executed by the provider computer processor causes the provider computer processor of the computer system to perform the method further comprising: categorizing the at least one of the individual user and the contact user of the plurality of users listed in the globally accessible contact list, based on identifiable relationships between user personal descriptors and the group of user defined rules, to create a state diagram of user personal descriptor trees and stringing together a community of the individual users and the contact users.

* * * * *